(12) United States Patent
Bowcutt et al.

(10) Patent No.: US 6,308,328 B1
(45) Date of Patent: *Oct. 23, 2001

(54) USAGE STATISTICS COLLECTION FOR A CABLE DATA DELIVERY SYSTEM

(75) Inventors: Roy A. Bowcutt, Alpharetta; Scott E. Hrastar, Duluth, both of GA (US)

(73) Assignee: Scientific-Atlanta, Inc., Lawrenceville, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/835,917

(22) Filed: Apr. 10, 1997

Related U.S. Application Data

(60) Provisional application No. 60/035,618, filed on Jan. 17, 1997.

(51) Int. Cl.⁷ .............................. H04N 1/173; H04N 9/00; H04N 7/16
(52) U.S. Cl. ................................ 725/111; 725/110; 725/9
(58) Field of Search ................................ 348/1, 3; 455/2; 395/200.55; 345/1, 2; 725/111, 112, 113, 109, 110, 105, 9, 14, 16, 10; H04N 1/00, 1/04, 1/175, 9/00, 7/16

(56) References Cited

U.S. PATENT DOCUMENTS

| | | |
|---|---|---|
| 4,207,431 | 6/1980 | McVoy .............................. 179/1 MN |
| 4,361,851 | 11/1982 | Asip et al. ............................... 358/84 |
| 4,536,791 | 8/1985 | Campbell et al. ................... 358/122 |
| 4,771,391 * | 9/1988 | Blasbalg .......................... 395/200.62 |
| 5,050,213 | 9/1991 | Shear ...................................... 380/25 |
| 5,113,429 | 5/1992 | Amlmeu et al. ...................... 395/325 |
| 5,185,860 * | 2/1993 | Wu ...................................... 395/200 |
| 5,239,540 | 8/1993 | Rovira et al. . |
| 5,261,044 | 11/1993 | Dev et al. ............................. 395/159 |

(List continued on next page.)

OTHER PUBLICATIONS

MCNS Holdings, LP; Data Over Cable Technical Reports, Operations Support System Framework for Data Over CableServices—TR–DOCS–OSSIW08–961016; pp. 1–20.
Cable Television Laboratories, Inc.; Data–Over–Cable Service Interface Specifications, Operations Support System Interface Specification—SP–OSSI–102–990113; pp. 1–26.

(List continued on next page.)

*Primary Examiner*—Andrew Faile
*Assistant Examiner*—Vivek Srivastava
(74) *Attorney, Agent, or Firm*—Kenneth M. Massaroni; Kelly A. Gardner; Hubert J. Barnhardt, III

(57) ABSTRACT

Apparatus for recording and collecting usage and other statistical data from components of a cable data network comprises a network manager for maintaining and collecting the statistics. Internet protocol addresses are associated with components of the network. The component maintains a software agent that manages a statistics database. Responsive to a manager request generated at a service provider defined time interval, the component software agent provides the usage statistics to the network manager in real-time during an Internet session with a host. When the host to Internet or other data connection is torn down due to failure, disconnect or inactivity time-out, remaining usage statistics data is collected and the session duration updated with the time of tear down. Usage statistics collected include the amount of data transferred to/from a host, the amount of data that is discarded due to insufficient resource capacity and amount of data that cannot be corrected despite forward error correction used in a downstream high capacity channel to the host. Data traps may be defined and downloaded to components of the network for implementation. As a result, billing of users of the cable data network can be usage sensitive and determined based on actual data transferred (including credit given for errored data) and/or time sensitive based on session duration.

62 Claims, 10 Drawing Sheets

U.S. PATENT DOCUMENTS

| | | | |
|---|---|---|---|
| 5,295,244 | 3/1994 | Dev et al. | 395/161 |
| 5,333,183 | 7/1994 | Herbert | 379/112 |
| 5,347,304 | 9/1994 | Moura et al. | |
| 5,423,003 | 6/1995 | Berteau | 395/200 |
| 5,436,909 | 7/1995 | Dev et al. | 371/20.1 |
| 5,504,921 | 4/1996 | Dev et al. | 395/800 |
| 5,586,121 | 12/1996 | Moura et al. | |
| 5,608,446 | 3/1997 | Carr et al. | 348/6 |
| 5,710,884 | 1/1998 | Dedrick | 395/200.47 |
| 5,712,897 | 1/1998 | Ortel | 379/22 |
| 5,720,025 * | 2/1998 | Wilkes et al. | 395/182.04 |
| 5,724,492 | 3/1998 | Matthews, III et al. | 395/119 |
| 5,768,280 | 6/1998 | Way | 370/486 |
| 5,790,806 * | 8/1998 | Koperda | 395/200.82 |
| 5,793,753 | 8/1998 | Hershey et al. | 370/252 |
| 5,799,002 | 8/1998 | Krishnan | 370/234 |
| 5,805,596 | 9/1998 | Kranzler et al. | 370/445 |
| 5,808,671 | 9/1998 | Maycock et al. | 345/180 |
| 5,818,845 | 10/1998 | Moura et al. | 370/449 |
| 5,828,655 | 10/1998 | Moura et al. | 370/236 |
| 5,859,852 | 1/1999 | Moura et al. | 370/449 |
| 5,892,812 * | 4/1999 | Pester, III | 379/34 |

OTHER PUBLICATIONS

Cable Television Laboratories, Inc.; Data–Over–Cable Service Interface Specifications; Operations Support System Interface Specification Radio Frequency Interface—SP–OS-SI–RFI–103–990113; pp. 1–29.

Dolors Sala's List of Publications and Technical Reports www.cc.gatech.edu/computing/Telecomm/people/Phd/dolors.

W. Richard Stevens; TCP/IP Illustrated, vol. 1, The Protocols; Chapters 1, 2, 3, 11, 25.

* cited by examiner

Ethernet Frame 311
With IP Datagrams as Data

USAGE STATISTICS COLLECTION FOR A CABLE DATA DELIVERY SYSTEM

This application claims the benefit of prior copending U.S. Provisional Patent Application Serial No. 60/035,618, filed Jan. 17, 1997, entitled "Cable Data Network System," of Roy A. Bowcutt et al.

BACKGROUND OF THE INVENTION

1. Technical Field

This invention relates to the field of cable data delivery systems and, more particularly, to the collection of usage statistics data for billing subscribers in a more flexible manner and for provisioning equipment for providing services at a desired quality of service.

2. Description of the Relevant Art

Cable television transmission systems have been utilized since the 1980's for the transmission of data, point-to-point or point-to-multipoint at T1 carrier rates of 1.544 megabits per second in a cable television system environment. Scientific-Atlanta, Inc. introduced and marketed a product known as the Model 6404 Broadband Data Modem in the early 1980's. One user coupled to a cable television distribution network can communicate to the world or two users, coupled to the cable television distribution network having a 0–54 Megahertz upstream or reverse path and a typical downstream path at frequencies above this range, can communicate with each other or with the world via a telephone central office. The upstream and downstream channels are spaced at approximately 750 kHz spacing; the modulation scheme is quadrature amplitude modulation, for example, 16-QAM. Each of two parties coupled to the cable television network can communicate in real time in a fill duplex manner with each other, each having an upstream and a downstream radio frequency path. A Model 6440 frequency translator translates the upstream channel path frequency to the downstream channel path frequency for each party as necessary. Up to 24 voice or data telecommunications channels are provided by such equipment. As is known in the data communication arts, such channels can be grouped to provide digital data services at variable data rates, for example, 64 kbits/sec, 256 kbits/sec or even 1.544 mbits/sec.

The radio frequency 0–54 MHz return path of a cable television system has been avoided by cable television system operators because it is notoriously noisy and the expense of adding reverse path amplifiers for return communications was not considered worth the investment by many in the industry until the late 1980's with the advent of impulse pay per view services. In stead, a telephone data return path has been used since the 1970's for return of data from a cable subscriber for service selection, home shopping, energy management and other purposes. U.S. Pat. Nos. 5,142,690; 5,155,590; 5,235,619 and 5,251,324 describe a cable television radio frequency reverse path data return system used for impulse pay per view services among other applications including collection of viewing usage statistics. U.S. Pat. No. 4,912,721 describes an upstream data path whereby the data is spread across an upstream television channel for transmission so as to avoid upstream noise ingress.

Digital data delivery services including digital audio and other services were also pioneered by Scientific-Atlanta. U.S. Pat. No. 5,239,540 describes a digital data delivery service for, for example, digital audio, game or software delivery to the home using quadrature partial response modulation (QPR). In allowed U.S. patent application Ser. No. 08/352,162, filed Dec. 1, 1994, and entitled "Secure Authorization and Control Method and Apparatus for a Gane Delivery System," there are described a number of different ways of billing for digital data services, in particular, game services, for example, in an "arcade" mode where a user plays as many programs as the user wishes within an allocated time period, for example, a number of hours for a set fee or in a pay-per-play mode where the game can last for a long time but the fee charged for play remains the pay-per-play fee. A periodic service offering method and apparatus is described by U.S. Pat. No. 5,604,528.

U.S. Pat. Nos. 5,347,304 and 5,586,121 describe an asymmetric network in which one path to a computer or work station is via a cable network such as a cable television network and the other path is via the telecommunications network. The '121 patent describes a network manager which handles or controls the forward (downstream) and return (upstream) communication to establish interactive full-duplex real-time network sessions between a host and a selected client device. Connection to the network is managed based on parameters such as the amount of times a device's channel requests have gone unfulfilled. The upstream channels are assessed as to quality based upon error rates, noise floor and signal-to-noise ratio. Channel quality monitoring for errors and signal-to-noise ratio is done transparently to the user and the applications. A failure in periodic upstream "heartbeat" messages at selected time intervals can indicate an upstream channel failure and necessitate a channel reassignment.

Recently, Scientific-Atlanta has applied for United States patents in the field of data network access devices, for example, cable modems. These include U.S. Patent application Ser. No. 08/627,062, filed Apr. 3, 1996, Ser. No. 08/738,668, filed Oct. 16, 1996 and continuation-in-part application Ser. No. 08/818,037, entitled "System and Method for Providing Statistics for Flexible Billing in a Cable Environment" of Koperda et al., filed Mar. 14, 1997. The '062 and '037 applications describe the problem of providing multiple tiers or levels of service in a new combined telecommunications/cable television environment. These patent applications describe radio frequency forward and reverse path applications which support, not only LAN-style services, but continuous bit rate, variable bit rate and available bit rates services. It is suggested in these applications to bill subscribers who use a shared upstream/downstream radio frequency bandwidth in accordance with tiers of predetermined, peak or maximum bandwidth or bit rate. A subscriber demanding more will be denied service while a subscriber demanding the maximum bit rate or less will receive data grants to transmit at predetermined bit rates for a predetermined time interval so as to share the bandwidth with other contending subscribers.

Despite the several improvements in the art of providing cable data delivery services in recent years, there remains an opportunity to further provide improved method and apparatus for collecting, storing and utilizing statistics for various purposes including flexible billing arrangements, provisioning of new equipment and facilities and ensuring that a desired level of service is being met for subscribers of a cable data delivery system.

SUMMARY OF THE INVENTION

In accordance with the principles of the present invention, there is provided a cable data delivery system in which the downstream data delivery system is provided over an existing cable television distribution network and the upstream path from a subscriber is provided over a standard telephone line. In this system, a network manager collects statistical data; there is provided agent software at locations of components of the system, for example, a cable modem, an upstream modem pool and a downstream communications manager. The software agent collects statistical data at a database to be referred to herein as a management information base and reports the collected statistics to a network manager under a simple network management protocol (SNMP). Specifically, the network manager under the SNMP collects data periodically during a a session and at the end of a session. The data collected comprises statistics including a) amount of data transferred in each direction (for example, Internet protocol (IP) packets of variable length), b) the amount of data that has to be discarded because of the lack of transmission capacity to forward the data, c) the amount of data that is so errored that it is uncorrectable despite forward error correction, d) from a–c, a packet loss rate, e) from a–c, a bit error rate and f) session duration. Moreover, one can initially provide or define and download for implementation data "traps" for collection of data that may be component specific, for example, loss of frequency lock at a cable modem and data transmission overload and underload at the communications manager in comparison with predetermined thresholds. In this manner, the network of the present invention is provided complete network management features including bandwidth management, accounting, authentication, element management as well as traditional network management.

Bandwidth management is particularly important in an asymmetric network in the downstream transmission direction. A communications manager under control of a control and management server provides bandwidth management over the cable distribution plant via application of the dynamic host configuration protocol (DHCP). Frequency allocation and channel addressing are performed via the association of a channel and data stream (pipe) pair or tuple with a cable modem. That is, the cable modem tunes to an assigned radio frequency channel and watches for data addressed to it in its assigned pipe.

Authentication relates to user authentication and service authorization and is more particularly described in copending, concurrently filed U.S. Application Ser. No. 08/835,916.

Accounting primarily relates to enhanced and flexible billing features provided by the present invention. Users may be billed according to actual data transferred and/or session duration. The user will not be charged for errored data. For example, if a high speed data link fails and the subscriber receives service at slower speeds, the subscribe will not be billed for high speed service and can be credited for loss of high speed service. Quality of service may be determined based on actual data throughput over time statistics which is a feature not contemplated in a traditional system where service quality depends on signal-to-noise ratio, noise level and bit error rate.

Element management is closely associated with accounting. Element management relates to provisioning of equipment to meet the needs of cable data network users. As demand for particular digital cable data delivery services increase, new equipment is provided to meet the demand for additional network capacity. The converse of element management is fault management which assists the system operator in determining problem areas within the network and replacing defective equipment or providing alternate routes as necessary.

Traditional network management relates to ensuring that a network user receives a channel that is not one which causes considerable errors and has a high signal to noise ratio. For example, according to U.S. Pat. No. 5,586,121, a network manager periodically insures that the user is receiving a channel that will provide the user with acceptable service.

Further details and features of the present invention will be understood from reading the detailed description of the invention in view of the drawings.

BRIEF DESCRIPTION OF THE DRAWINGS

FIG. 8 shows system participants; FIG. 9 shows for the cable television system, the three main components, digital, analog and cable data; FIG. 10 shows for cable data, the system map display; FIG. 11 shows an example of domain management and FIG. 12 shows an example of threshold management.

DETAILED DESCRIPTION

Figure 1:
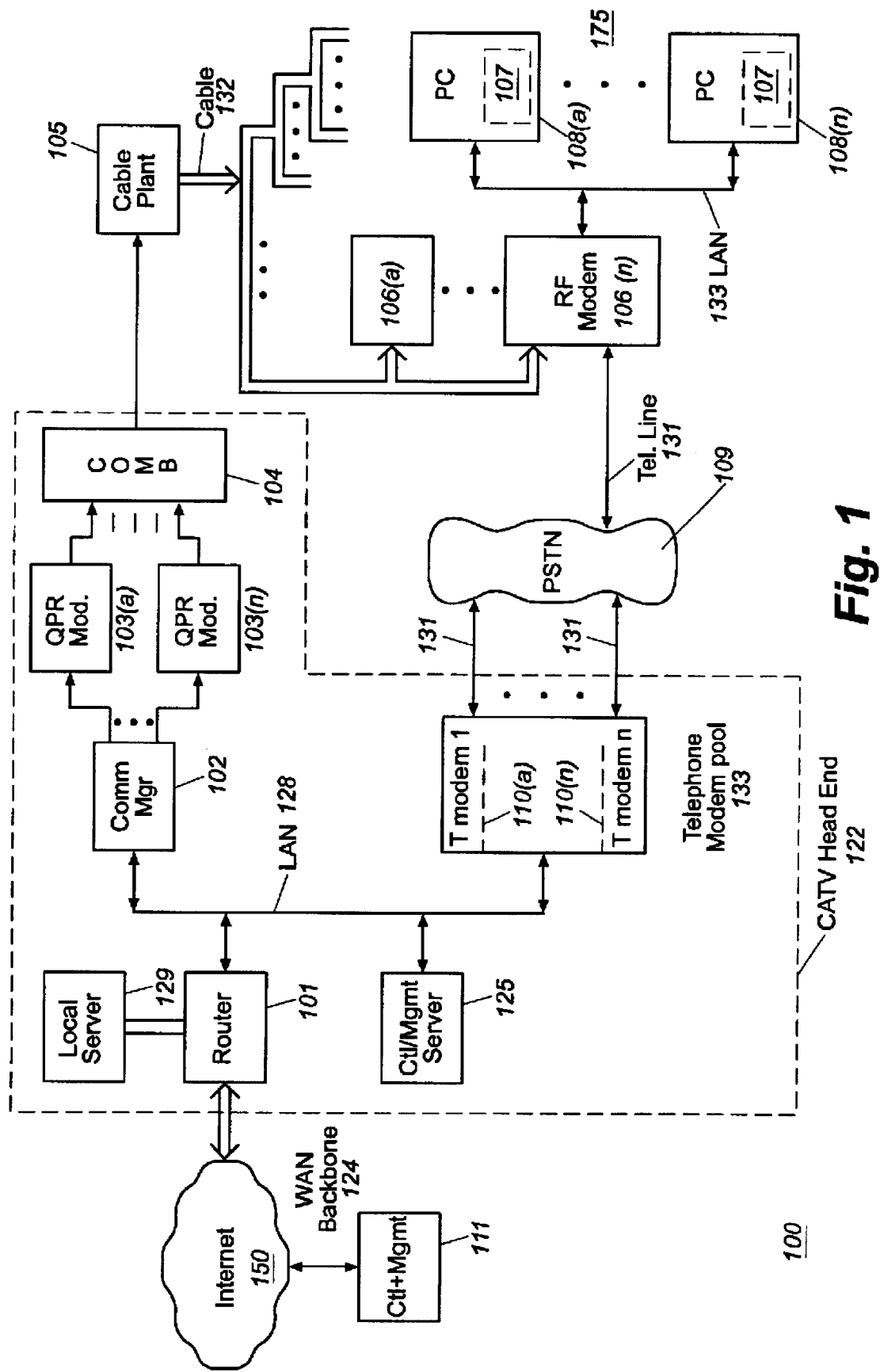
FIG. 1 is a system block diagram of a cable data delivery system having a radio frequency forward or downstream path and a telephone return or upstream path from which usage and other statistics are collected according to the present invention.

The following Detailed Description will begin with an overview of Internet protocol (IP) packets (data grams) and of the IP addressing architecture employed in the cable data network of FIGS. 1 and 2 and will then describe the physical components of the cable data network. First FIG. 3 will be described showing the interrelationship between data grams and Ethernet frames used to carry them. Then, the QPR modulator baseband data structure will be described with reference to FIG. 4. The major components of the cable data network of FIGS. 1 or 2 to be discussed in connection with the present invention are the cable modem 106 (FIG. 5) and the network control and management server 111, 125 (FIGS. 6–12). Components bearing reference numerals introduced in FIG. 1 are identified similarly in subsequent figures.

Figure 3:
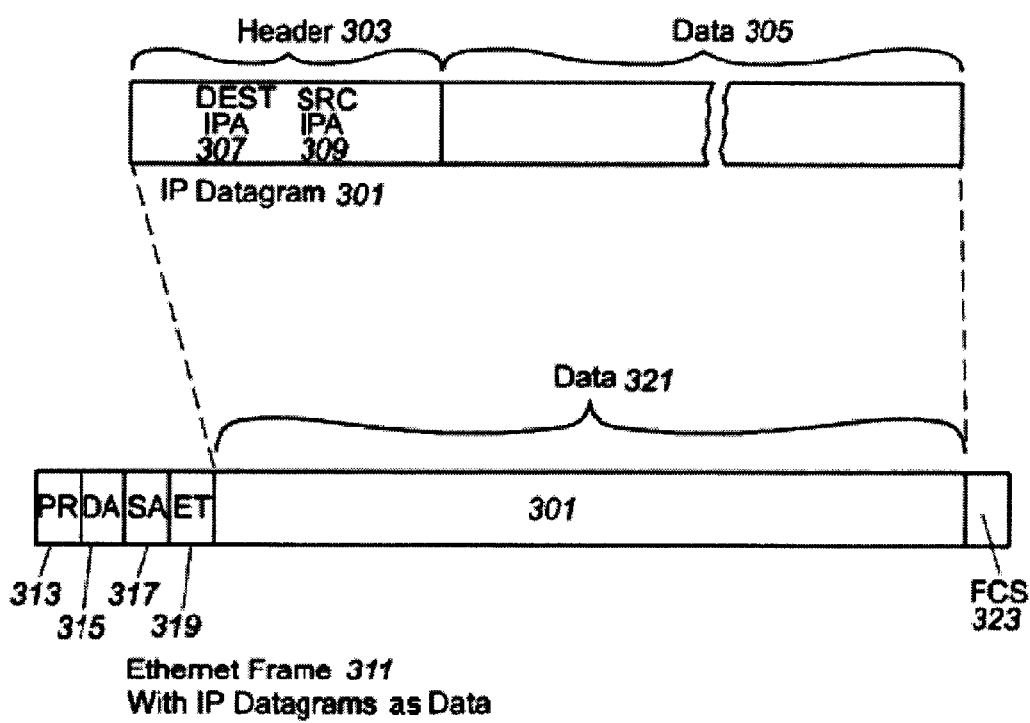
FIG. 3 is an exploded drawing showing the interrelationship between an Internet protocol (IP) packet or datagram 301 and an Ethernet frame 311 where the IP datagram becomes the data field 321 of the Ethernet frame.

Internet Protocol Packets (data grams): FIG. 3

FIG. 3 shows those parts of an Internet protocol (IP) packet or datagram 301 that are required to understand the following discussion of how components of the cable data network 100 (FIGS. 1 and 2) collect statistical data and report the collected data to a network control and management server 111, 125. An IP packet 301 has two main parts, header 303, which carries control information about the packet, and data 305, which is the data being transported in the packet. Header 303 has a fixed format and length, while data 305 may have a varying length. All that need be known about the contents of header 303 for the present discussion is that it contains two 32-bit Internet Protocol (IP) addresses, one of which, destination IP address (DEST IPA) 307 specifies a destination in the Internet to which IP packet 301 is to be delivered, and the other of which, source IP address (SRC IPA) 309, specifies the source in the Internet of packet 301. Sources and destinations of Internet packets 301 are termed herein Internet hosts. An Internet host is an entity in a network which has an IP address and which is capable of responding to at least some of the protocols in the TCP/IP protocol suite. For details on IP addressing and the protocols of the TCP/IP protocol suite, see W. Richard Stevens, *TCP/IP Illustrated: The Protocols*, Addison-Wesley, 1994, which is hereby incorporated by reference into this patent application.

The Internet is a logical network, not a physical network. Internet packets 301 are transported across a variety of different physical networks. While an Internet packet 301 is in a given physical network, it is transported in the same fashion that the physical network transports any kind of data. For example, one common kind of physical network is a local area network (LAN) that uses the 10 Base T protocol. One example of such a LAN is a LAN that uses the Ethernet® protocol developed by Xerox Corporation. In the Ethernet protocol, data moves in packets called frames. Each frame has a preamble (PR) 313, a destination Ethernet address (DA) 315, a source Ethernet address (SA) 317, an ether type (ET) field, which specifies a type of the protocol, a data field 321, which carries the data (IP data gram 301), and a frame check sequence (FCS) 323, which is an error checking code. When an Ethernet frame 311 is carrying an IP datagram 301, IP datagram 301 simply occupies data field 321. It is worth pointing out here that the Ethernet protocol does not examine the contents of data 321. There may of course be many levels of protocols between an IP datagram 301 and the physical medium upon which the IP datagram is being transported. In the following, only the next level down from the IP level is of concern, and this level is termed generically the link level, with the addresses at that level being termed link addresses. Thus, if the link level employs the Ethernet protocol, the link addresses are DA 315 and SA 317.

The IP addressing and routing architecture

The IP addressing and routing architecture of the cable data network defines how the IP addresses which are used to route Internet protocol packets (data grams) in the Internet are mapped onto the networks which make up the cable data network's link level. The architecture has a number of fundamental principles:

Each cable data network defines its own IP addressing domain, i.e., the network defines how IP addresses in a set of IP addresses which has been assigned to the cable data network are assigned to component devices in the cable data network of FIGS. 1 or 2.

All devices in the cable data network which do routing or maintain data bases used in determining routes are IP hosts.

Within the addressing domain, sets of IP addresses are assigned to hosts connected by a LAN to an RF modem, which is in turn connected to a CATV cable that is part of a network in the addressing domain. The RF modem functions as a router for packets addressed to the hosts connected to the LAN.

IP routing in the networks consisting of portions of the cable network is hierarchical. An IP packet addressed to a host is first routed to the proper cable network 100, then captured by the host's RF cable modem 106 and finally routed to the host, such as a personal computer 108 by the RF modem.

The RF cable modem 106 may receive IP packets addressed to its hosts from two independent link level networks: an RF link level network (for example, a CATV network) and a switched public telephone network (PSTN). The RF modem may further route outgoing IP packets via the switched public telephone network.

Several advantages flow from these principles:

Because all of the devices that do routing or maintain routing data bases are Internet hosts, IP address assignment, packet rerouting, and network management can be done using the standard DHCP, RIP, and SNMP TCP/IP protocols. For details, see the Stevens reference, supra.

Because the RF modem 106 can receive packets addressed to its hosts not only via the RF link level, but also via the telephone network, if the RF link fails, packets for the hosts can be simply rerouted to the RF modem via the telephone network 109. Moreover, the rerouting can by done by means of the RIP TCP/IP protocol.

Packets sent to the RF modem via the telephone network may be employed to tune the RF modem to a particular channel in the RF link, making it possible to dynamically assign a channel in the RF link to an RF modem. In effect, a link-level address in the RF link is dynamically assigned to the RF modem.

Because the cable data network can assign its own IP addresses, a mixed static-dynamic policy for assigning addresses may be pursued, with components that are constantly active having statically-assigned IP addresses and components that are intermittently active, such as the RF modems and the hosts attached to them, having dynamically-assigned IP addresses that are assigned at the beginning of activity by the component and are deassigned at the end of activity. The dynamic assignment of IP addresses to RF modems 106 and their hosts 108 makes it possible to share a small number of IP addresses among a much larger group of users. Moreover, the dynamic assignment of IP addresses can by done by means of the DHCP TCP/IP protocol.

The dynamic assignment of IP addresses to RF modems also makes it possible to share a small number of addresses in the RF link among a much larger group of RF modems.

Network management can be done by means of the SNMP TCP/IP protocol.

The number of IP addresses required in the network is further reduced by giving the RF modems 106 a reusable IP address for use inside the LAN 133 to which a given RF modem's hosts 108 are attached.

Further details of IP addressing of components of cable data network 100 are provided in concurrently filed, copending U.S. patent application Ser. No. 08/833,198 entitled "Apparatus and Methods for Automatically Rerouting Packets in the Event of a Link Failure" of Bowcutt et al.; Ser. No. 08/837,073 entitled "Method of Using Routing Protocols to Reroute Packets During a Link Failure" of Bowcutt et al.; Ser. No. 08/843,061 entitled "Methods for Dynamically Assigning Link Addresses and Logical Network Addresses"

of Hrastar et al., now U.S. Pat. No. 6,208,656; Ser. No. 08/843,056 entitled "Router which Dynamically Requests a Set of Logical Network Addresses and Assigns Addresses in the Set to Hosts Connected to the Route" of Hrastar et al., now U.S. Pat. No. 6,178,455; Ser. No. 08/838,833 entitled "Router for Use with a Link that has a Set of Concurrent Channels" of Bowcutt et al.; Ser. No. 08/832,714 entitled "Method of Dynamically Assigning a Logical Network Address and a Link Address" of Hrastar et al. and Ser. No. 08/840,304 entitled "Router for which a Logical Network Address which is not Unique to the Router is the Gateway Address in Default Routing Table Entries" of Hrastar et al. Physical Components of the Cable Data Network: FIG. 1

Referring to FIG. 1, the physical components of a cable data network 100 are shown in a functional schematic block diagram of a preferred embodiment. Cable data network 100 provides cable data services to subscriber locations 175 of the network. Cable data services may comprise Internet services, video-on-demand service, interactive game, software delivery and other services too numerous to mention. A new field of revenue opportunities are available to a cable television system operator who provides cable data services in addition to their more typical cable television channel line-up. A cable television service provider typically has a preexisting cable distribution plant 105 for providing a downstream path over coaxial cable, hybrid fiber/coaxial cable or fiber optic facilities over a frequency range of 50 to 450 megahertz. With improvements in cable distribution plants over recent years, the bandwidth of services provided in a downstream or forward path through the network to a subscriber 175 has improved from 400 MHZ to over one gigahertz. The present invention, however, may be utilized to advantage in older cable systems as well because 1) the bandwidth requirements for providing cable data services are not substantial in the downstream direction and 2) the present invention suggests utilizing the telephone line for providing the more problematical reverse or upstream path to the service provider. That is not to suggest that the present invention may not be likewise used in more sophisticated cable plants where an upstream or reverse radio frequency path is provided, for example, in the 0–54 megahertz or 750 megahertz to one gigahertz spectra or both or other upstream radio frequency path.

The depicted cable data delivery system supports either connection-less or connection-oriented communication paradigms. As a system develops, the system can be expanded to support additional services including, for example, variable bit rate (VBR) and available bit rate (ABR) services, for example, based on the ATM class of service architecture described by Koperda et al., U.S. application Ser. No. 08/627,062, filed Apr. 3, 1996, Ser. No. 08/738,668, filed Oct. 16, 1996 and Ser. No. 08/818,037, filed Mar. 14, 1997. As will be described further below, Internet protocol (IP) is used in the cable data delivery system as the network level communications protocol. Internet protocol addressing is described further in copending U.S. Patent Applications already cited above bearing Ser. Nos. 08/833,198, 08/837,073, 08/843,061, 08/843,056, 08/838,833, 08/832,714, and Ser. No. 08/840,304 filed concurrently herewith.

The headend equipment 122 that is provided by one or more service providers is represented by router 101 for routing cable data, communications manager 102 for organizing and forwarding cable data in the downstream direction over radio frequency facilities, a telephone modem pool 135. for receiving cable data in the upstream path over telecommunications facilities and a network control and management computer/server 111, 125 for diagnostic, billing, provisioning and other functions necessary to network management and control. The slower speed upstream path 131 may be wired or wireless (for example, by cellular telephone) and, if wireless, may be provided by non-telephone low earth orbit satellite or telephone satellite path. Router 101 is connected to Internet 150 by wide area network (WAN) 124. Router 101 is further coupled to modem pool 135 and to control and management server 111, 125 by 10BaseT Ethernet local area network (LAN) 128.

Network control and management server 111 is preferably a computer or work station having a processor, memory and an operator display. In one embodiment of the control and management server 111, the management platform is Open-View (OV) Network Node Manager software available from Hewlett Packard Corporation. The OV platform provides facilities for transport of simple network management protocol (SNMP) requests to software agents resident in network components including the cable modem, the communications manager and the modem pool as will be further discussed in reference to FIGS. 6 and 7. The control and management server provides data/timestamp to data stored and received from components and automatically determines severity levels by comparison of data to predetermined thresholds.

Local server 129 may be a local Internet server either provided by the cable service provider or another information service provider. Local server 129 may obtain and store for forwarding at user request files of another information service provider, for example, of locally significant or other popular data for downloading at high speed to user locations 175.

In the downstream path, the communications manager 102 comprises a data processor and memory for storage of statistical data, for example, traffic loading on each data stream and at each QPR modulator frequency. The communications manager 102 formats the downstream data for delivery to users into streams (later referred to herein as pipes) for transmissions via at least one and potentially a bank of up to n quadrature partial response modulators 103 operating in frequency bands that are not utilized for cable television services. The statistical data maintained then may be referred to herein as a pipe queue and statistical information is maintained for each queue. The modulated data streams are combined at combiner 104 along with cable television service signals and enter the cable plant 105 for serving subscriber locations 175 of which only one is shown.

The network control and management server 111 communicates with the communications manager 102 (as well as the modem pool 135) via Ethernet LAN 128. The internal processor of the communications manager in accordance with what will be referred to herein as agent software communicates with a hierarchy of management information bases (MIB's) or memory storage locations to retrieve identified data stored in the MIB's as will be discussed in further detail in reference to FIG. 7. Network control and management server 103 collects statistics from the modem pool 135 in a similar manner.

The output modulated data streams of QPR modulators 103 are similar to those first proposed and described by U.S. Pat. No. 5,239,540 which describes a digital audio delivery service over a cable television network. Scientific-Atlanta, Inc. further expanded the capabilities of that system for game delivery and proposed a super-packet framing concept for digital data. Occupying a 3 MHz band, quadrature partial response modulators 103 allow 6 Mbps per channel in the downstream data direction to the subscriber location 175. A typical modulation scheme is nine level quadrature partial response. The tuning frequencies are selectable in 250 kHz steps over a range of for example, 51.5 MHz to 600 MHz. Further details will be provided in the discussion of FIG. 4. Further details of error detection, correction and packet rebuilding are provided by U.S. patent application Ser. No. 08/835,966 filed concurrently herewith entitled "System and Method for Detecting, Correcting and Discarding Corrupted Data Packets in a Cable Data Delivery System" of Barker et al., now U.S. Pat. No. 6,052,819.

Besides Internet 150, the depicted cable data delivery system also supports a metropolitan area network of distributed headwinds (not shown). Interconnection then may be Internet based on a general telecommunications backbone via gateway switches or routers located at one or more of the distributed headwinds.

Cable subscriber location 175 includes a cable modem 106 and one or more hosts, such as personal computers, game players, intelligent telecommunications apparatus, work stations, television/web browser or other user apparatus, 108 having included communication control software 107. The cable modem is provided with a 10 Base T Ethernet port 133 for communicating with the one or more personal computers 108. Each host personal computer or work station 108 has a standard Ethernet plug-in module or card supporting 10 BaseT LAN communication. When the subscriber initiates service, the subscriber activates their remote communication control software 107 of personal computer 108, a connect request is passed to cable modem 106 over the 10 Base T Ethernet LAN. The cable modem 106 then responds by automatically dialing up a telephone modem pool 135 via the public switched telephone network (PSTN) 109 initiating a point-to-point protocol (PPP) link negotiation. The modem pool 110 comprises modulators/demodulators provided, for example, by Ascend Communications Corporation, U.S. Robotics, Motorola or other manufacturers. The router 101, alerted by the modem pool 110, responds to the call and receives initial cable data via a Radius server sub-system from the subscriber entered via a keyboard or other data entry means of their personal computer 108 to signify their identity and password. Assuming successful authentication, an IP assignment will be passed back to cable modem 106 to complete the PPP link establishment. Network control and management server 111, 125 verifies and authenticates the user and signals the router to permit cable data services. Internal to the control and network manager 111, 125 is a session timer which begins operating once the IP address is assigned to begin timing the Internet or other session. Modem 106 responds by transmitting a dynamic host configuration protocol (DHCP) request to receive its frequency and data stream assignment for the session as will be further described herein. After receiving the frequency and stream assignment, a connect acknowledgment is passed backed to the session control software. After receipt of this acknowledgment, communications manager will transmit a final addressed acknowledgment to the service requesting modem 106 on its assigned radio frequency and data stream. Once the cable modem 106 receives this final acknowledgment, it signals the personal computer 108 that the radio frequency downstream session is available. Further details regarding authentication of users is described by U.S. patent application Ser. No. 08/835,916, filed concurrently herewith entitled "Two-Tiered Authorization and Authentication for a Cable Data Delivery System" of Scott E. Hrastar.

Internet services are provided at exceptionally high data rates in the data downstream direction via the QPR modulators 103 and is in excess of one megabit per second. This high data rate compares with conventional telephony data rates of 28.8 to, as of recently, 56.6 kilobits per second. Cable modem 106 tunes to a previously identified radio frequency output of one of the QPR modulators 103, demodulates a particularly identified data stream and accepts data bearing its unique address. The unique address is preferably one that is assigned at manufacture.

The upstream telephone path via PSTN 109 is presently limited to telephony data rates, for example, of 56.6 kilobits per second. Nevertheless, the approximately twenty times higher downstream data rate is applicable for video conferencing, video-on-demand services, interactive games, data intensive photographic or other image file downloading and the like which can be cached or preserved at local server 129 and delivered instantaneously on demand of subscriber 175, without having to utilize slow Internet connections to service providers (not shown) coupled to Internet 150.

Router 101, such as a Cisco Systems 7000 series router, is a gateway between the Internet 150 and the cable data delivery system. Standard wide area facilities, such as T-1 or T-3 carrier telephone facilities, connect the router 101 to the Internet. In the downstream direction from the router toward subscriber location 175, 100 Mbps Fast Ethernet (100 Base T) local area network 122 is used to interconnect the router with the communications manager 102. End-to-end networking is provided using Internet protocol.

Cable data network 100 transfers data packets with IP addresses between Internet 150 and hosts 108. Cable data network 100 also transfers packets with IP addresses among the components of cable data network 100 and uses Internet 150 to exchange data packets with IP addresses between cable data network 100 and remotely-located control and management components 111. These components typically deal with functions such as receiving information about new subscribers or billing.

Packets from Internet 150 that contain the IP address of a host 108(*i*) are received in CATV head end 122, are put in the proper form for transmittal over cable 132 belonging to the CATV system, and are transmitted via cable 132 to RF modem 106(*j*) of modems 106(*a*) to 106(*n*) to which destination host 108 (*i*) of hosts 108(*a*) to 108(*n*) is attached. RF modem 106(*j*) reads the IP address of host 108 from the packet and routes the packet to host 108(*i*). Packets from host 108(*i*) which are intended for a destination in Internet 150 go to RF modem 106(*j*), which routes them via telephone line 131 and public switched telephone network (PSTN) 109 to a telephone modem (Tmodem) 110(*k*) in telephone modem pool 135 in head end 122. Tmodem 110(*k*) routes the packet to router 101, which routes it to Internet 150. Since public switched telephone network 109 allows bidirectional communication, router 101 may also route packets received from Internet 150 for host 108(*i*) to host 108(*i*) via Tmodem 110(*k*) of Tmodems 110(*a*) to 110(*n*) and RF modem 106(*j*). As will be explained in more detail in the following, this route is used in the event of a failure in the CATV portion of network 100 including, for example, but not limited to network elements 103, 104, 105, 132.

Continuing with the details of the implementation of cable data network 100, data packets are transferred between Internet 150 and CATV head end 122 by means of a transmission medium belonging to a wide-area backbone network (WAN) 124. Typically, the transmission medium will be a high-speed, high-capacity fiber optic cable such as a T1 or T3 cable, but it could also be a terrestrial or satellite microwave link. The transmission medium is connected to router 101, which in a preferred embodiment may be a router belonging to the 7000 series manufactured by Cisco Systems, Inc., San Jose, Calif.

Router 101 is coupled between WAN backbone 124 and local-area network (LAN) 120, which is the link-level network that connects the components of cable data network 100 which are located in CATV head end 122. Router 101 may both receive packets from backbone 124 or LAN 120 and provide them to backbone 124 or LAN 120. Each component connected to LAN 120 has both an IP address and a LAN address on LAN 120, and router 101 contains a routing table which it uses to route IP packets to IP hosts, including other routers. Router 101 examines every packet it receives on WAN backbone 124 or LAN 120; if the packet's destination IP address is one of the ones in the routing table, router 101 routes it to the component on LAN 120 which is to receive IP packets having that address; if it is not one of the addresses in the routing table, router 101 routes it to WAN backbone 124, which takes it to Internet 150. In each case, router 101 puts the data packet into the proper form to be transmitted via the relevant link-level network.

As will be apparent from the foregoing discussion, LAN 120 and router 101 can be used to route IP packets received from Internet 150 and destined to a host 108 via two routes. The first is via communications manager 102 and cable plant 105, cable 132, and RF modem 106. The second is to host 108 via telephone modem pool 135 and RF modem 106. Packets from host 108 and from RF modem 106 go via telephone modem pool 135 and LAN 120 to router 101. In other embodiments, it may also be possible to route packets addressed to RF modem 106 via the first route. Router 101 can finally route packets via Internet 150 between the components in head end 122, hosts 108, RF modems 106, and control and management component 111.

When packets are to go to a host 108 via cable 132, they are routed to communications manager 102, which puts the packets into the proper form for transport by that link-level network.

Figure 4:
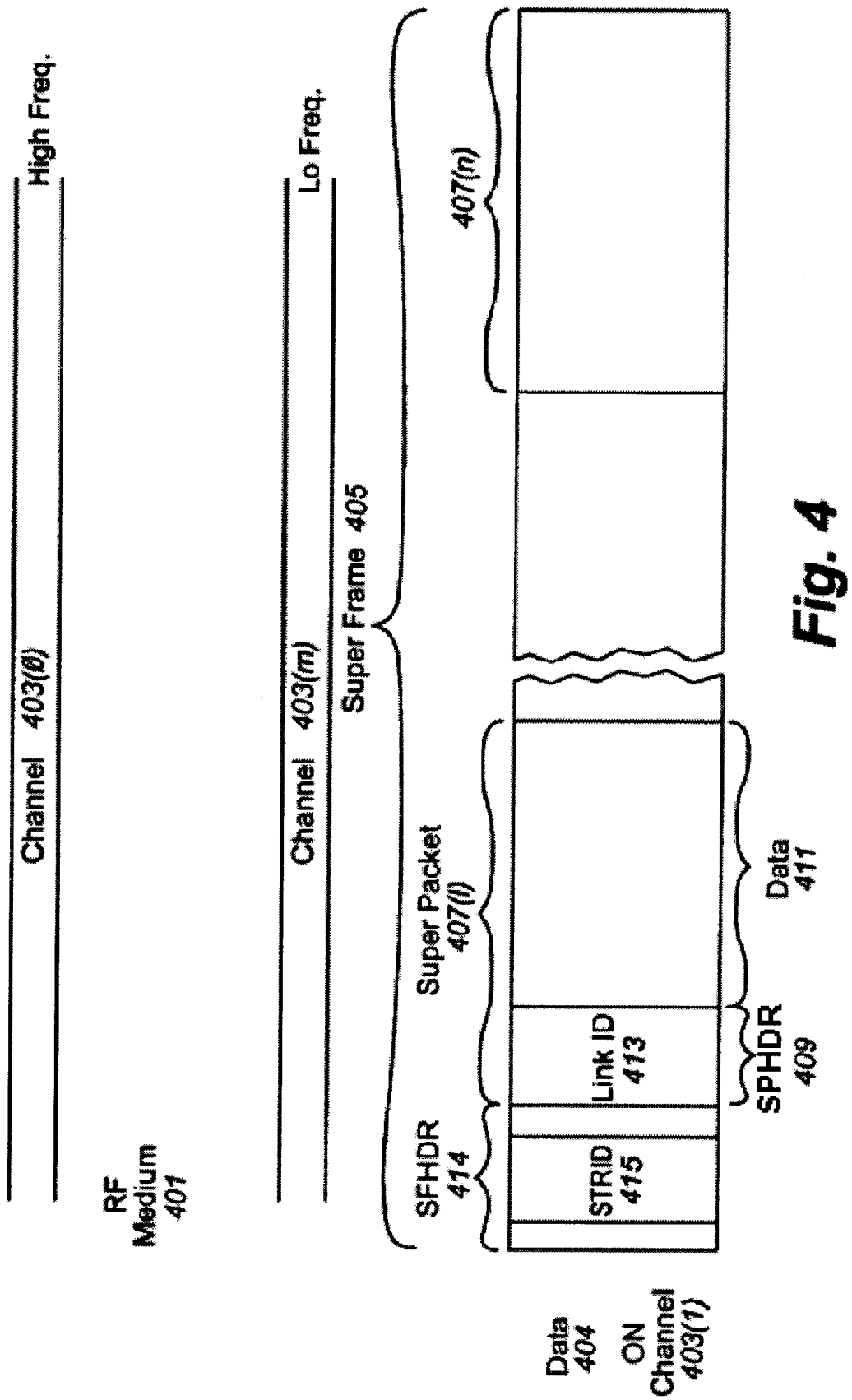
FIG. 4 provides details of how data 411 is transported in an RF medium 401, namely via the cable distribution plant 105 of FIGS. 1 and 2.

Downstream Radio Frequency Channel Assignment: FIG. 4

FIG. 4 shows how data is transported on cable 132 in a preferred embodiment. Cable 132 is an RF medium 401 which carries data in a fixed number of channels 403 (0–m). Each channel 403 occupies a portion of the range of frequencies transported by cable 132. Within a channel 403($i$), data moves in superframes 405. Each superframe 405 contains a superframe header (SFHDR) 414 and a fixed number of fixed-sized superpackets 407 (1–n). The only portion of the superframe header 414 that is important to the present discussion is stream identifier (STRID) 415, which is a unique identifier for the stream of data carried on channel 403. The combination of a channel's frequency and the stream identifier 415 uniquely identifies the network to which cable 132 belongs in the CATV system. As will be explained in more detail later, this unique identification of the network cable 132 belongs to is used by communications manager 102 to determine which network should receive the IP packets intended for hosts 108 connected to a given RF modem 106($i$).

Each superpacket 407 contains a header (SPHDR) 409 and data 411. The header contains a link identifier (LinkID) 413 in cable network 132 for an RF modem 106. The number of superpackets 407 is the number of pipes in channel 403($i$). When a given RF modem 106($i$) is active, it is associated with a <channel, pipe, Link ID> triple, that is, the RF modem 106($i$) is tuned to the channel 403($j$) specified in the triple and watches the superpackets that belong to the pipe specified in the triple. For example, if the RF modem is associated with pipe 3, it watches superpacket 407(3) in superframe 405, and if superpacket 407(3)'s header 409 contains RF modem 106($i$)'s Link ID 413, RF modem 106($i$) reads data 411 from superpacket 407(3). The <channel, pipe, Link ID> triple is thus the link address of RF modem 106($i$) on cable 132. Data 411 is of course all or part of an IP packet 301. If the IP address of packet 301 specifies a host 108 connected to RF modem 106($i$), RF modem 106($i$) routes it to that host 108.

Returning to communications manager 102, that component receives IP packets 301 addressed to hosts 108 connected to networks whose link layers are cables 132 connected to head end 105 and routes them to the proper RF modems 106 for the hosts. It does this using a routing table which relates the IP address of an active host 108 to one of the networks and within the network to a <channel, pipe, Link ID> triple specifying the RF modem 106 to which the host 108 is connected. As employed in the present context, an active host is one that currently has an IP address assigned to it. Using the information in the routing table, communications manager 102 makes superframes 405 for each channel 403($i$) in the network containing cable 132. The superframes contain superpackets 407 directed to the RF modems 106 connected to that channel for which communications manager 102 has received IP packets 301. The superframes are stored in a dual-ported memory which is accessible to QPR modulators 103.

There is a QPR modulator 103($a$–$n$) for each channel 403 in a given network 100, and the QPR modulator 103 reads the superframes 405 for its channel, digitally modulates the RF signal for the channel according to the contents of the superframes 405, and outputs the modulated signal to combiner 104, which combines the outputs from all QPR modulators 103 and provides the combined output to cable plant 105, which outputs it to cables 132 belonging to the network. The QPR modulators 103 employ quadrature partial response modulation. Of course, any kind of digital RF frequency modulation could be employed as well including QAM. It should also be pointed out that any arrangement could be employed which relates a given RF modem 106 to a portion of the bandwidth of the network to which cable 132 belongs, rather than the <channel, pipe, Link ID> triple used in the preferred embodiment, and that the portion of the bandwidth that carries packets addressed to hosts 108 connected to a given RF modem 106 can be termed in a broad sense the RF modem's "channel".

Following cable 132 to RF modem 106, RF modem 106 is connected between cable 132, a LAN 133 to which one or more hosts 108 are connected, and telephone line 131 and provides interfaces to cable 132, LAN 133, and telephone line 131.

Figure 5:
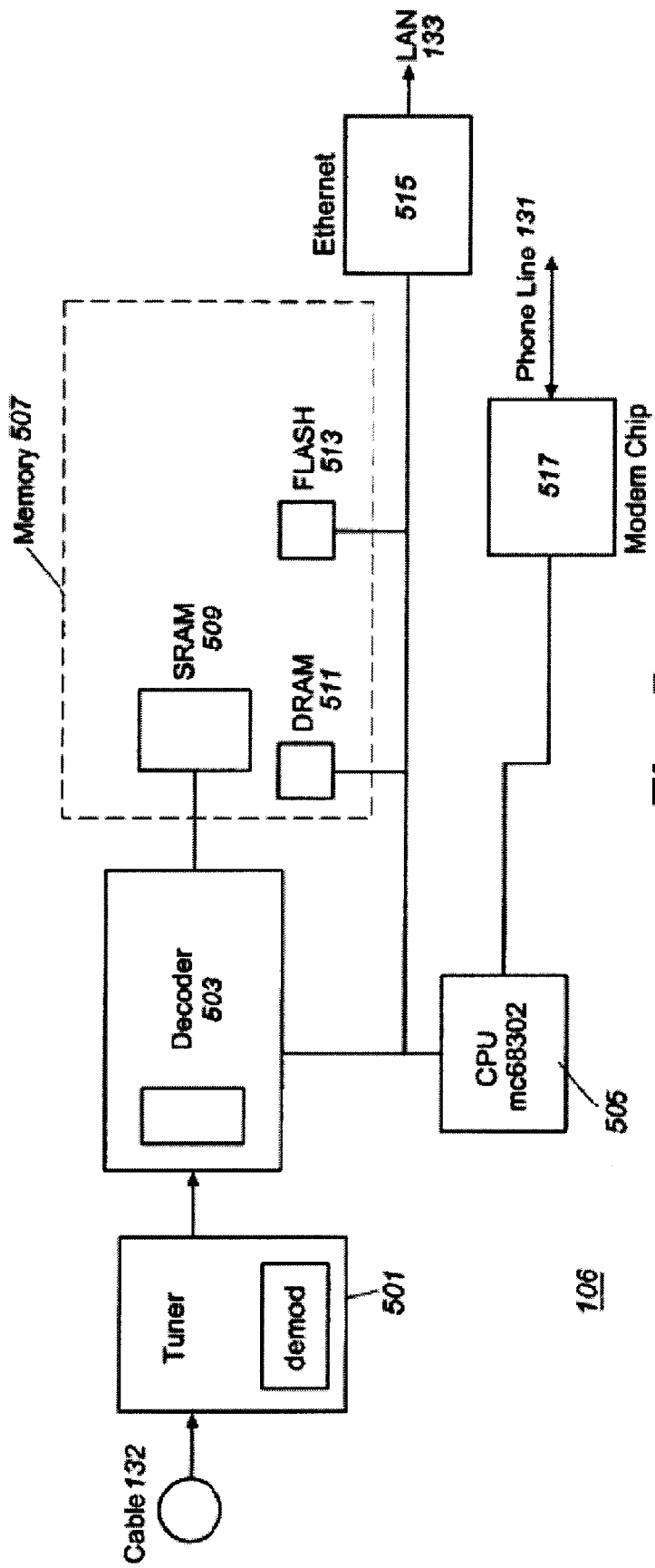
FIG. 5 is a schematic block diagram of a cable modem 106 of FIGS. 1 or 2.

Cable Modem Hardware Components: FIG. 5

FIG. 5 shows a block diagram of a preferred embodiment of RF modem 106. The components of RF modem 106 operate under control of CPU 505 and read data from and write data to memory 507, which has three kinds of memory components: static RAM 509, which is nonvolatile, that is, it is writable but retains its contents when RF modem 106 is turned off, dynamic RAM 511, which is volatile, and FLASH RAM 513, which is nonvolatile and writable but will only permit a fixed number of writes. SRAM 509 is used to store data which changes but must be kept across activations of RF modem 106. Examples of such data are the RF modem's telephone number and the addresses of RF modem 106 and hosts 108 on LAN 133. Statistics about the performance of the radio frequency network such as bit error rate (BER), number of user data gram bytes passed, number of hours of active operation and number and frequency of undecodable packets are available through a management information base (MIB) and retrieved on command by resident agent software for local output or transmittal to, for example, network control and management server 111, 125. DRAM 511 is used for data that is only valid during an activation, such as the current routing table. FLASH RAM 513 is used for information that changes only rarely, such as the programs executed by CPU 505. In the preferred embodiment, RF modem 106 can load programs it receives in IP packets via cable 132 or telephone line 131 into Flash RAM 513.

Turning to the interfaces and beginning with the interface to cable 132, that interface has two main components, tuner 501 and decoder 503. Tuner 501 can be tuned under control of CPU 505 to a channel 403(*i*) in cable 132. Tuner 501 further demodulates the superframes 405 it receives on that channel and passes them to decoder 503. Decoder 503 examines superpacket 407(*i*) for the pipe which carries data addressed to RF modem 106, and if the Link ID 413 in superpacket 407(*i*) specifies RF modem 106, decoder 503 does error correction, decodes the data, and passes it to memory 507. Decoder 503 maintains statistics in status registers related to the quality of the received QPR signal, data framing status and error detection flags. Decoder 503 monitors the pipe and frequency to which tuner 501 is tuned and flags a loss of radio frequency lock, storing such a flag in memory.

When an IP packet has accumulated in memory 507, CPU 505 examines the destination IP address in the packet, and uses a routing table in memory 507 to determine whether the packet is addressed to a host 108 connected to RF modem 106. If the packet is so addressed, CPU 505 obtains the LAN address corresponding to the IP address. CPU 505 provides the LAN address and the location of the packet in memory 507 to Ethernet integrated circuit 515, which packages the packet into one or more Ethernet frames and outputs it to Ethernet 133.

RF modem 106 may also receive IP packets via phone line 131 and modem chip 517 that are addressed either to the RF modem 106 itself or to one of the hosts 108 connected to RF modem 106. In the first case, RF modem 106 responds to the packet; in the second, it routs the packet to the host as just described for packets from cable 132. When RF modem 106 receives a packet via LAN 133 that is not addressed to RF modem 106 itself, it routes the packet via modem chip 517 and telephone line 131. Included in host 108 is the software 107 necessary to interact with RF modem 106.

Continuing with the portion of the link level that is implemented using the public switched telephone network 109, modem chip 517 in RF modem 106 is connected by means of a standard analog telephone line 131 to public switched telephone network 109, and RF modem 106 can thus call other telephone numbers via PSTN 109 and be called from other telephone numbers in PSTN 109. In the present case, when RF modem 106 wishes to set up a session that will permit it to transfer IP packets 301 for a host 108, it calls a telephone number for telephone modem pool 135. The modem pool responds by assigning a telephone modem (Tmodem) 110 to RF modem 106 and assigning RF modem 106 an IP address. As shown in FIG. 1, telephone modem pool 135 is also connected to LAN 120 in head end 122. Telephone modem pool 135 serves as a router with respect to LAN 120 and the telephone connections currently being served as by the Tmodems 110 in the modem pool 135. Once a telephone modem 110 and an IP address have been assigned to RF modem 106, RF modem 106 may send IP packets 301 to the devices connected to LAN 120 and receive IP packets 301 from those devices.

As will be explained in more detail in the following, the fact that PSTN 109 provides a bi-directional link between the devices connected to LAN 120 and RF modem 106 is employed to determine where RF modem 106 is in the cable network managed by head end 122, to dynamically assign a <channel, pipe, Link ID> triple in cable 132 to RF modem 106, and to provide an alternate route to hosts 108 connected to RF modem 106 when there is a failure in the RF link between head end 122 and RF modem 106.

The remaining device which is connected to LAN 120 is control/management server 111, 125, which in a preferred embodiment is implemented in software executing on a server constructed by SUN Microsystems, Inc., Mountain View, Calif. Control/management server 111, 125 manages CDN 100. It responds to DHCP packets by dynamically allocating IP addresses to hosts 108 and sending SNMP packets to router 101 and communications manager 102 which cause them to set their routing tables as required for the newly-assigned IP address, responds to SNMP trap packets (for transmitting, for example, fault or overload data) from the devices connected to LAN 120 and from RF modems 106, responds to RIP packets as required to update routings, and maintains the Management Information Database used by the SNMP protocol as well as a list of unassigned IP addresses. A graphical user interface (display 680 of FIG. 6) in control/management server 125 shows the current status of CDN 100 and permits operator intervention in the operation of cable data network 100.

Figure 2A:
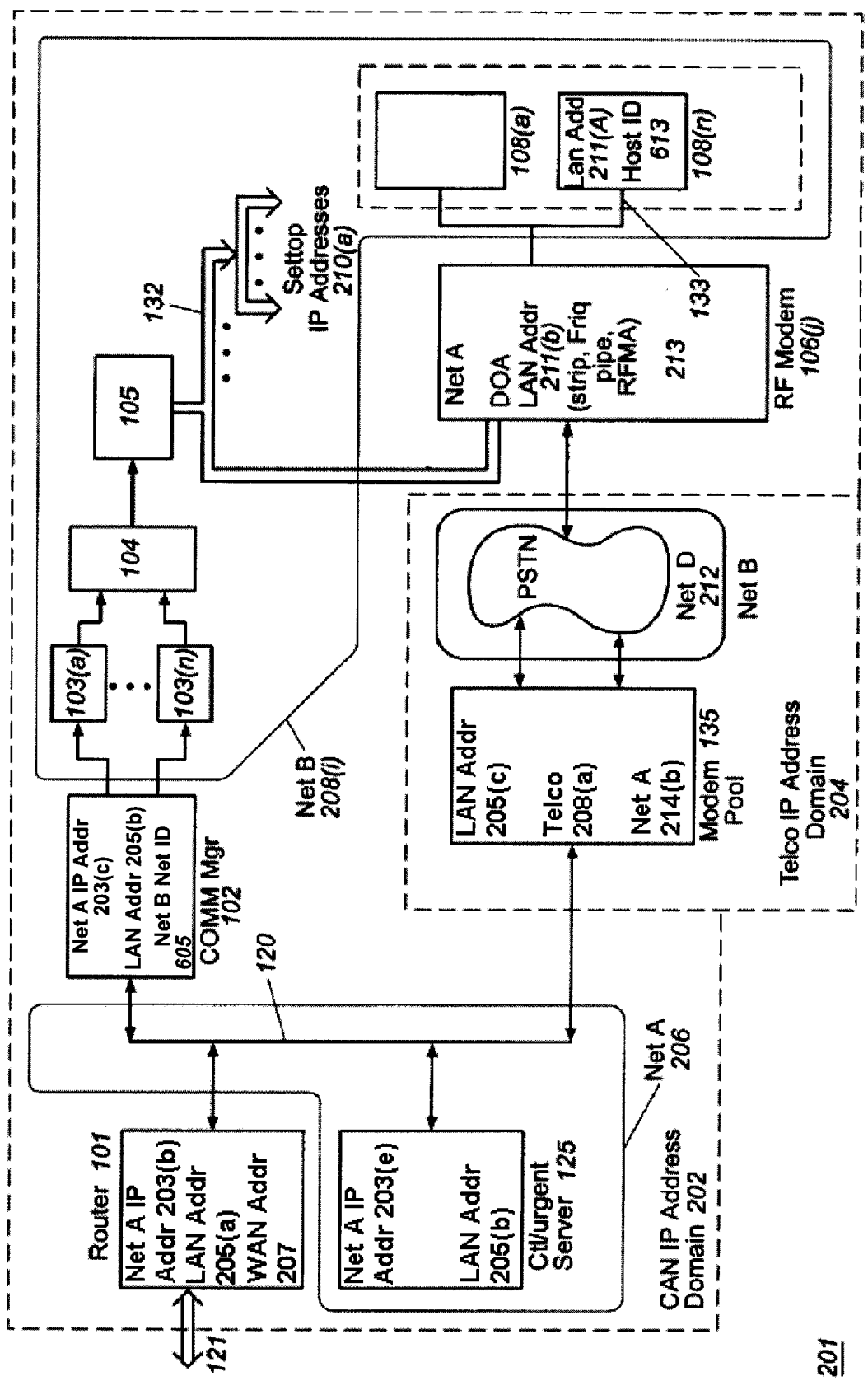
FIG. 2A is a further system block diagram similar to FIG. 1 but showing the dynamic assignment of addresses to components of the cable data delivery system.
Figure 2B:
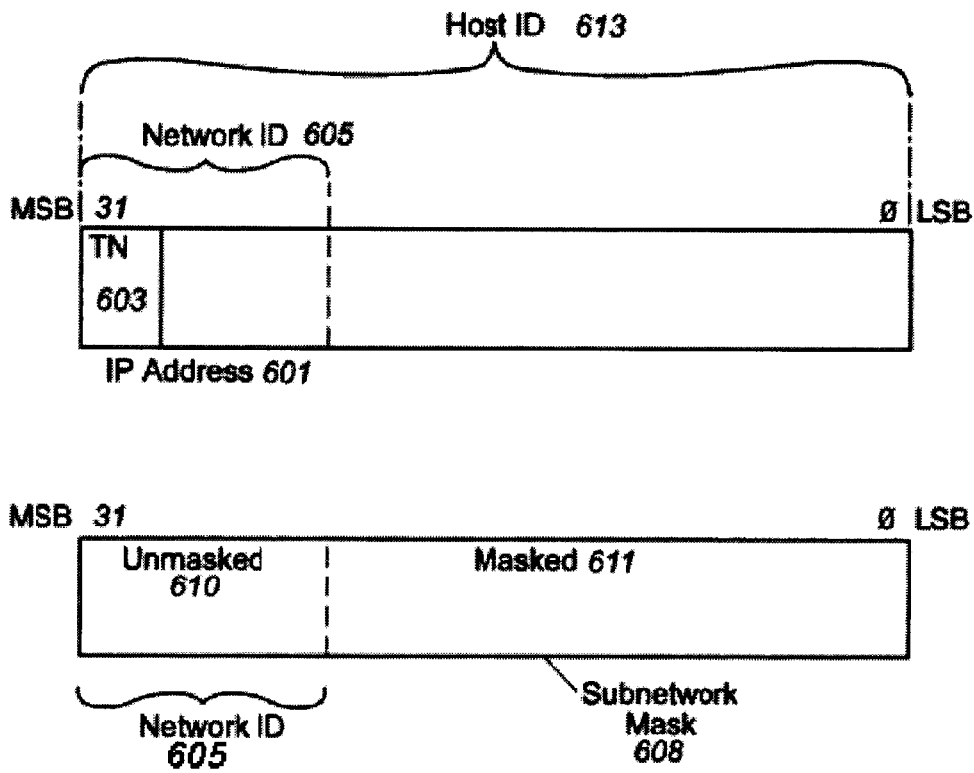
FIG. 2B provides details of host and network addressing as shown by way of example in reference to FIG. 2A.

IP Addressing Architecture of CDN 100: FIGS. 2A and 2B

CDN 100 maintains its own IP address domain. The proprietors of CDN 100 receive a set of 32-bit IP addresses and can apply those addresses to devices connected to CDN 100 as they see fit. FIG. 2B shows 32-bit IP address 601. The 32 bits are divided into two fields: type field 603, which defines the type of IP address 601 and host ID field 613, which identifies a specific host 108. The host Ids 613 are organized into sets of IDs for the networks in the address domain. This is done by means of a technique called classless interdomain routing (CIDR). In this technique, the entire address is a host ID 613 that identifies an individual host; some number of the least significant bits of the host IP address are designated to specify a given network belonging to the domain; these bits are the same for all IP addresses in the given network and make up network ID 605.

Packets with IP addresses that have been assigned using the CIDR technique are routed by means of subnetwork masks. A subnetwork mask 608 is a 32-bit string of bits that is used to mask an IP address, that is, to select that part of the IP address that is currently relevant to the routing process. For example, if the IP address is being routed to the network it belongs to, the only part of the address that is relevant is the part that contains network ID 605. As shown in FIG. 2B, in this case, unmasked part 610 selects the bits of network ID 605; masked part 611 hides the remaining bits of the IP address. Once the packet is in the network identified by network ID 605, the entire IP address is relevant and none of it is masked.

Using this technique, the proprietors of a domain of IP addresses can easily define the number of hosts 108 in a particular network 100. In CDN 100, the bits of IP address 601 specified by the subnetwork mask that identifies network ID field 605 specify a portion of a metropolitan cable network (for example, a single cable 132, a single cable plant 105 and the cables radiating from it, or even a single head end 122 and the cables 132 served by it). Host ID field 613 identifies one of the hosts 108 in the network 100 identified by network ID field 605. As one would expect from the fact that CDN 100 has a relatively small number of CATV cables, a relatively large number of RF modems 106, and a relatively small number of hosts 108 per RF modem 106, the number of bits in network ID field 605 is comparatively small.

Comparison of addresses for routing purposes is done using subnetwork masks 608. The order in which an IP address being routed is compared to addresses in the routing table is by the unmasked length of the address in the routing table. Thus, the address being routed is compared first with addresses that are completely unmasked. For details, see Stevens, supra, pp. 7–9 and 140–141.

FIG. 2A shows the IP networks that exist in the cable data network 100 and how they relate to the link level networks. Each addressable component of the cable data network 100 appears in FIG. 2 with the IP addresses and link level addresses that apply to it. As is the case with all IP networks, each host 108 must have its own IP address and must have in addition the address of a gateway in the network to which it can send IP packets for routing. Only one set of the IP networks, namely networks B (NetB) 208(0 . . . n) need belong to cable data network IP address domain 202, that is, the cable data network assigns the addresses from the set provided to it. In the preferred embodiment, networks A and D also belong to address domain 202. IP addresses in network A all have network A's NetID 605 and IP addresses in network B all have network B's NetID 605. The third IP network is network D 212. The router for this network is modem pool 135. In a preferred embodiment, the IP addresses in network D 212 are not visible outside cable data network 100. In other embodiments, the IP addresses in network D 212 may belong to another domain entirely, for example, one belonging to the telephone company that provides the modem pool 135.

Continuing with IP network A 206, this network has LAN 120 as its link level network. LAN 120 connects components of cable data network 100 that are always in use, and consequently, the IP addresses in network A 206 may be statically assigned. Routers with IP addresses in Net A are router 101, communications manager 102, and modem pool 135.

IP network B 208(i) may be one of several such networks, each of which will have its own statically-assigned NetID 605. Network B 208(i) has as its link layer one or more cables 132, to which RF modems 106 are connected. The router for network B 208(i) is communications manager 102. Each active RF modem 206(j) in network B 208(i) has a set 210(j) of IP addresses having network B 208(i)'s network ID 605 that are available to be assigned to hosts 108 connected to RF modem 206(j). An active RF modem 106 is one that has an active host 108 connected to it. Any IP address having the network ID for the network may belong to a given set 210(j). The link level network for each set of IP addresses 210(j) is the LAN 133 connecting the hosts 108 with RF modem 106(j). RF modem 106(j) serves as the router for that set of addresses. IP addresses of hosts 108 in net B 208(i) are dynamically assigned by control/management server 111, 125. When RF modem 106(j) becomes active, control/management server 111, 125 assigns modem 106(j) a set of IP addresses for the hosts 108 connected to RE modem 106(j). The IP addresses have the NetID 605 for network B 208(i)and as many host IDs 613 as are required for the hosts 108. Every host 108 connected to an RF modem 106(j) has an IP address for RF modem 106(j). Cable data network 100 conserves IP addresses by giving every RF modem 106(j) on a network the same IP address on LAN 133 connecting hosts 108 to RF modem 106.

As indicated before, network 212 D uses hidden IP addresses belonging to the domain of cable data network 100 in a preferred embodiment, but the IP addresses may also be provided by another party such as a telephone company. The link layer in this network is public switched telephone network 109. When RF modem 106(j) dials into modem pool 135, modem pool 135 dynamically assigns RF modem 106(j) an IP address. Modem pool 135 also functions as the router in network 212 D. Modem pool 135 routes incoming IP packets with RF modem 106(j)'s IP address via network D 212 to RF modem 106(j). When the RF link is inoperative, modem pool also routes incoming packets with the IP addresses of the hosts 108 attached to RF modem 106(j) to RE modem 106(j), which routes them further to the hosts. Modem pool 135 additionally routes all outgoing packets received from RF modem 106(j) via LAN 120 to router 101.

Router 101 normally routes IP packets destined for network B to communications manager 102 and those destined for network D to modem pool 135. If there is a failure in network B, router 101 can also route packets destined for a host 108 connected to RF modem 106(j) to RF modem 106(j) via network D.

FIG. 2A also shows the IP and link layer addresses by means of which the components of CDN 100 may be reached. Beginning with the components on Net A 206, router 101 has an IP address 203(b) of its own in Net A 206 and also has an address 205(a) on LAN 120 and an address 207 on WAN 124. Communications manager 102 has an IP address 203(c) of its own in Net A 206 and an address 205(d) on LAN 120. Router 101 also routes all packets to communications manager 102 that are to be carried via the networks B 208 specified in one or more NETID fields 605 in the IP addresses. Continuing with control/management server 125, that component has an IP address 203(e) in Net A 206 and a LAN address 205(b). Modem pool 135 has an IP address 214(b) in Net D 212, a LAN address 205(c), and a telephone number 208(a) in PSTN 109.

Continuing with network B 208(i), a given host 108(k) in a given subnetwork C 210(j) has a dynamically-assigned IP address. In the address, the host ID 613 specifies host 108(k) and the net ID 605 specifies network B 208(i). Each host also has a LAN address 211 in LAN 133. The most complex addressing situation is that of RF modem 106(j). RF modem 106(j) has an IP address 214 in network D 212, has a reusable IP address in LAN 133. At the link address level, RF modem 106(j) is addressed in cable 132 by a <channel, pipe, Link ID> triple, has a LAN address 211(b) in LAN 133, and has a telephone number 208(b).

Every host in an Internet network has a routing table. The routing table relates destination IP addresses of IP packets that are received in the host to gateway IP addresses of hosts on the same link-level network as the host to which the routing table belongs. If the host is a router, its routing table will relate IP addresses that are received in the router to IP addresses of hosts on the link-level networks that are connected by the router. Thus, a host can send an IP packet to a host on another link-level network by sending the packet to the router in the host's link-level network that sends packets to the other link-level network. Every host in an Internet network is also capable of executing the ARP protocol, which translates an IP address into a link-level address of the link-level network that the host is connected to.

Actually routing an IP packet received by a host is thus a two-step process. First, the host consults the routing table to find the gateway IP address corresponding to the IP packet's destination IP address; the gateway IP address specifies which host on the link-level network the IP packet is to be sent to; then the host executes the ARP protocol to find the link-level address of the host specified by the gateway IP address. When the host has the link-level address, it puts the IP packet in the form required by the link-level network and sends it to the link-level address. In order to save time in executing the ARP protocol, each host also has an ARP cache, which is a table of the current mappings between IP addresses of hosts in the link-level network and the link-level addresses of those hosts. For details on routing tables, see Stevens, supra, pp. 111–117; for details on the ARP protocol, see Stevens, supra, pp. 53–64 and in co-pending and concurrently filed U.S. Patent Applications already referenced above directed to IP addressing.

Figure 6:
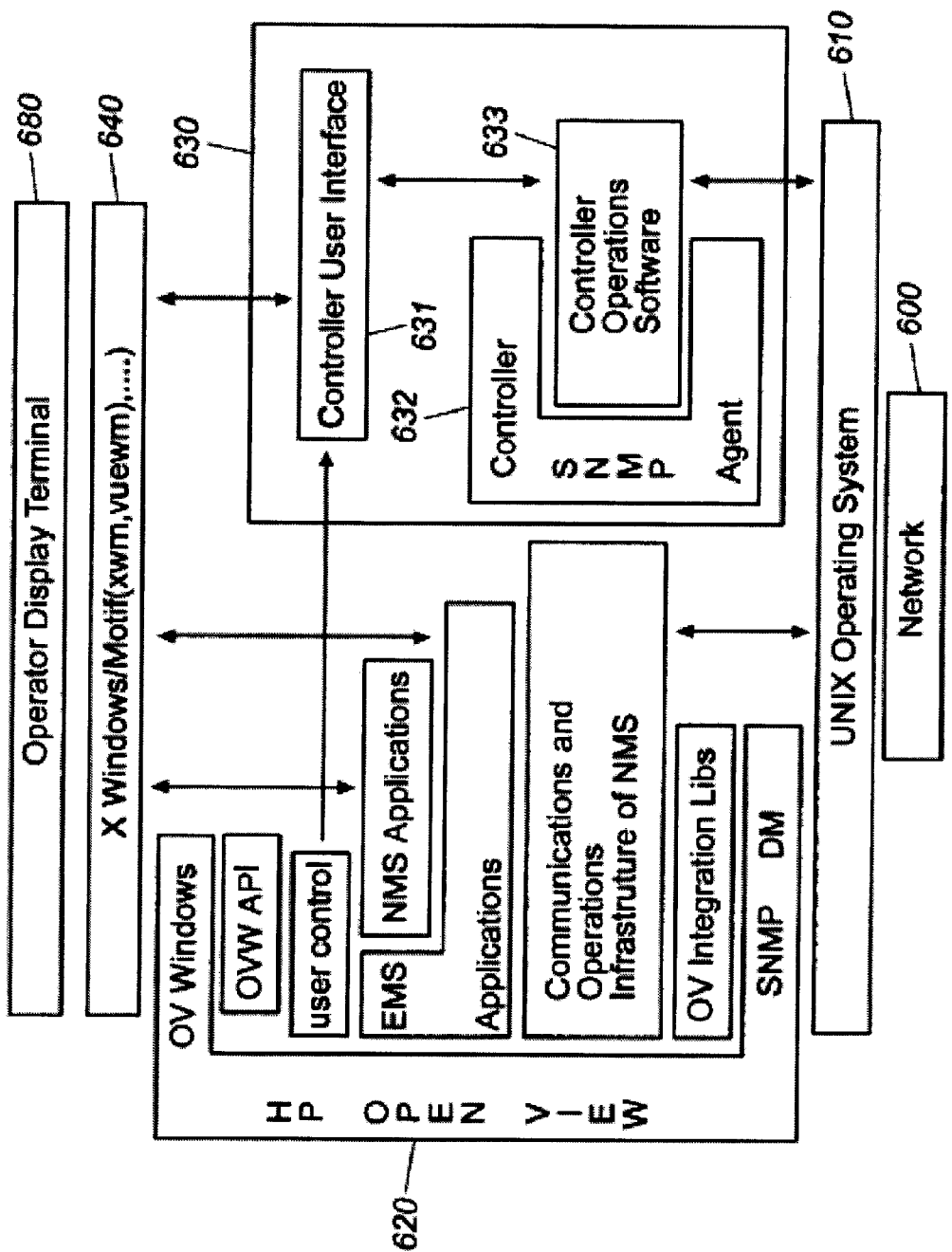
FIG. 6 is a functional schematic diagram of the software architecture for the network control and management server 111, 125 of the system of FIG. 1 or 2 also showing its relationship to the cable data network of FIGS. 1 or 2 and to a display terminal for viewing data, for example, per FIGS. 8–11.

Software Architecture of a Network Control and Management Server: FIG. 6

Control and management server 111, 125 comprises a typical computer or work station running applications software including an operator display terminal 680 for outputting statistical information for management of the network of FIGS. 1 or 2. A preferred management platform (software) is OpenView (OV) Node Manager (NMM) offered by Hewlett-Packard Corporation for general network management. The functional block diagram of FIG. 6 depicts this specific application of OV 620 running under an operating system such as UNIX 610 via a controller 630. The OV software 620 permits application-specific programming, for example, for management of the cable data delivery network of FIGS. 1 and 2. The OV platform 620 provides for transport of SNMP protocol data units (pdu's) (data fields stripped from the Ethernet packet) from the control and management server 111, 125 to its software agents at various components of the network as described by FIG. 7. At each component and at the server 111, 125 are located management information bases MIB's) which are loaded and unloaded by the agents in response to SNMP requests. The agent for server 111, 125 is denoted simple network management protocol (SNMP) controller agent 632 of controller 633. Besides MIB's there exist "traps" or registers for storing special condition indicators such as loss of carrier and the like at components as appropriate. These may be downloaded for new or different traps under OV 620 as circumstances warrant. These under control of the components are reported to the network control and management server 111, 125, logged in as to time of reception and stored. Also, as will be seen from FIGS. 8–12, the control and management server 111, 125 provides an overall network topology map so that the cable television facilities can be regarded side by side with the cable modem delivery network facilities and any other facilities for which headend 122 is responsible. The topology maps are output to operator display 680 via Xwindows Motif 640.

An OV for Windows application of OV 620 provides a graphical user interface for one or more cable data network operators. MIB's may be browsed and associated topologies of networks and components can be viewed at operator display terminal 680.

The OV software provides many LAN based network management features. An event browser: shows taps as they are received at the server 111, 125, provides a data timestamp and degree of severity by comparison with thresholds, indication of the type of trap via simple text fields, groups traps depending on user preference and manages two state alarms. Again, traps may be defined, downloaded and established in components from any control host.

Figure 7:
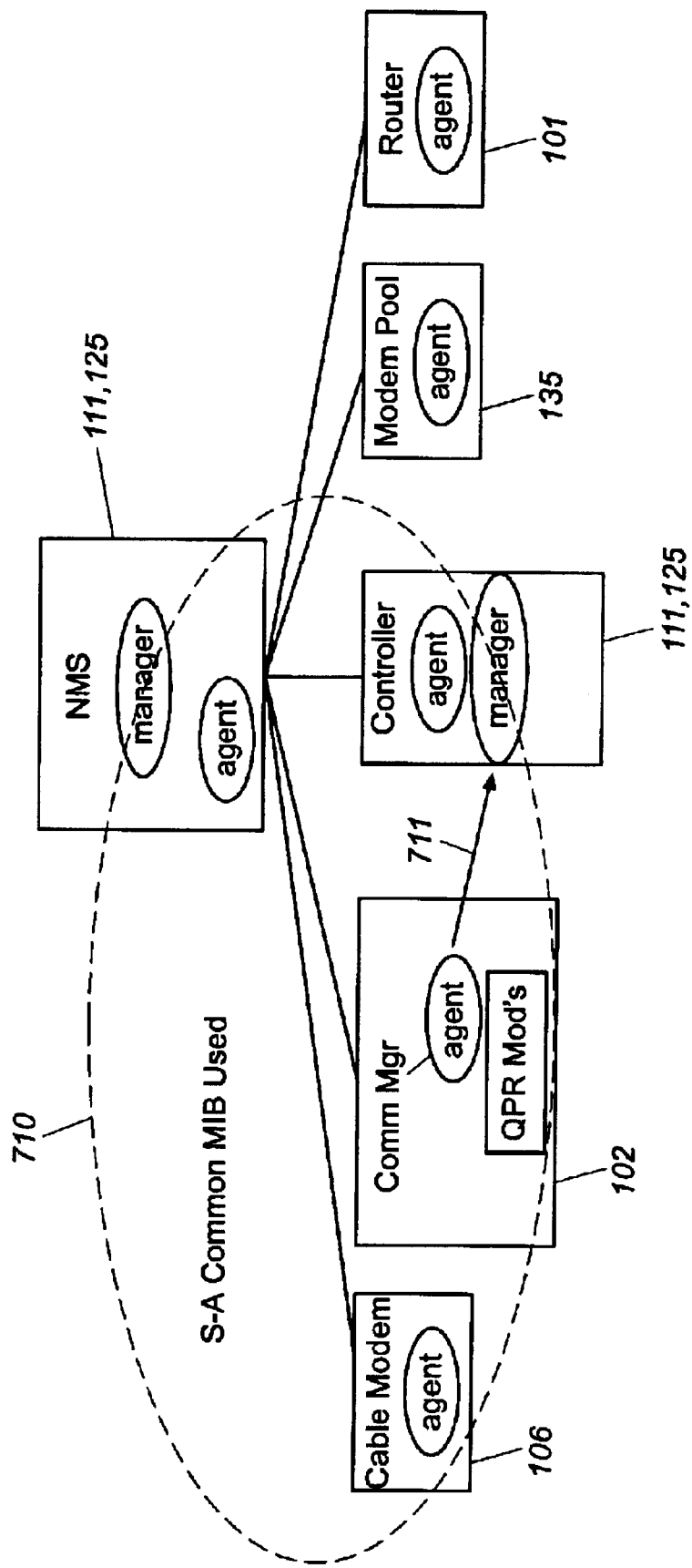
FIG. 7 is diagram showing the manager/agent relationship between network control and management server 111, 125 and agents distributed in components of the cable data network of FIGS. 1 or 2.

Manager/Agent Relationships—FIG. 7

Referring now to FIG. 7, there are shown the relationships among the manager software and resident agents at network components. Within certain equipment, a common management information base may be defined. According to FIG. 7, the common MIB 710 comprises the cable modem 106, the communications manager 102, the control and management server 111, 125 and the controller 630. The modem pool 135 and router (manufactured by other than Scientific-Atlanta) may be outside the common MIB 710. These function similarly in preserving statistical data and responding to SNMP query or transmitting trap indicators.

A control agent 632 is physically located at the control and management server 111, 125. The control software 633 derives and controls failure cases. Consequently, the agent 632 generates SNMP traps and manages several objects in the common MIB 710.

A control manager is a cooperative manager responsible for receiving events from the communications manager 102 by the arrow 711. These events refer, for example, to queue threshold events and other performance related data used in management of the available spectrum over cable distribution plant 105 (cable 132). The communications manager agent of corn manager 102 provides SNMP traps and MIB access to the com manager MIB for, for example, the QPR modulators 103. It also manages the data formatter functionality.

At cable modem 106 is located the cable modem agent which reports to network and control server 111, 125. This agent manages the cable modem and may derive and act as a proxy for an end-user host 108.

The modem pool 135 and router 101 each have an agent that reports to the network manager 111, 125. Each of these operates similarly to provide statistical data to the server 111, 125.

The following kinds of statistics are available at NMS 111, 125: The number of cable network operators and simultaneous sessions (average and maximum number); the number of components managed in each category; the maximum number of cable modems simultaneously in use (average and maximum). These can be utilized to provision equipment resources, especially com manager 102, QPR modulator 103, facility 105, cable modem 106 and Tmodem pool 135 associated resources.

Each MIB, the common MIB 710 and the modem pool 135 and router agent 101 MIB's, is organized as a tree and the leaves of the tree represent data to be obtained or accessed. The advantage of the present system is that a system operator can provide an enhanced flexible billing system. The information service provider or cable data service provider can bill based on data transferred and the quality of data received. The operator can credit for errored packets that cannot be reconstructed and bill for data transferred. If a high speed downstream link fails, the subscriber may be credited for the loss of high speed service and only billed for the slow speed service they receive during high speed link outage. Since IP packets are of variable length, assumptions can be made of the average length of the packet. In a more exacting environment, hooks exist in the cable modem 106 (for example, decoder 503) for determining during the IP packet reconstruction process exactly how much data was transferred because the received Ethernet packets, as described above, are broken down into data segments of predetermined length. Also, the service provider may bill determined by session duration stored at the network control and management server 111, 125 by session and user identification and time of day. These features for usage statistics retrieval will be further understood as each parameter is described in further detail.

Number of Packets Transferred: The number of IP packets transferred in each direction are stored in the common MIB 710 for the cable modem and communications manager and in the modem pool 135 MIB. In the upstream direction, the agent is in the modem pool 135 and also may be in the cable modem 106. In the downstream direction, the agents are in the communications manager 102 and in the cable modem 106. As already indicated the cable modem 106 and com manager 102 may report to the OV NMS of the server 111, 125 and the com manager 102 agent may report to the controller manager 630.

A periodic poll is administrable by the service operator through OV 620. The operator may set the periodic poll interval for polling the MIB's for data transferred or other data type. Some data types may be requested more frequently than other data types during a session. For example, buffer capacities for one type of data may differ from collecting data for another type. More specifically, data transferred can be high and should be retrieved frequently for a heavy downstream bandwidth user and light for a user that does occasional surfing with little bandwidth demand.

Also, a single poll is utilized at the end of a session to retrieve the status of a statistic, for example, data transferred, at the end of a session and since the last periodic poll. A session can be torn down because of subscriber disconnect or service failure such as telephone line or cable failure. Also, a session can be torn down due to subscriber inactivity after a service provider selectable period of time has elapsed.

Number of Packets Discarded: If the network component does not have the capacity to send the data it receives, i.e. forward a packet, the data (packet) is discarded and a count is maintained at a component of the number of packets discarded. Since packets are requested again, the parameter is an indicator of slow or poor quality of service despite the high speed data links. The parameter is collected from the modem pool 135 and cable modem upstream and from the communications manager 102 and the cable modem 106 downstream.

Number of Uncorrectable Packets: Packets that are received at the cable modem 106 are received with forward error correction which is a coding technique that can correct burst errors. Despite the forward error correction, there still may be delivered uncorrectably packets, in broader terms, an amount of errored, uncorrectable data, that is counted at the cable modem, for example, and stored in a MIB. This, then, is a downstream data statistic that is significant to the proper operation of the communication manager, the QPR modulators and the cable plant.

Packet Loss Rate: This statistic is number of packets discarded over transferred as an upstream measurement and downstream it is the uncorrectable packets over the number of packets transferred described above. It is preferably calculated at network and control server 111 after the data from the various components is received.

Bit Error Rate: The number of bits in error over time is collected based on inferences made at the cable modem 106 or derived specifically as described above. The bit error rate is a downstream path statistic.

Session Duration and Timing: The session clock is started once the cable modem 106 receives its Internet address for downstream traffic authorization. The session clock can be used in combination with the data transferred to provide, for example, a downstream data efficiency measured by data transferred over time. A time stamp records session start and session tear down either due to disconnect or inactivity timeout.

Consequently, with these parameters the objectives of the present invention are met for achieving a flexible billing arrangement. Users may be billed for session duration, actual data transferred (less errored) or a combination of these parameters. Moreover, other network management features are provided for provisioning for new equipment and for fault management.

Data traps provide for automatic reporting of such parameters as queue overload and underload or loss of frequency lock. These can be defined and downloaded provided the component has the capability to store the newly defined data in a trap. The data provided by these traps can be compared with network topology and displays may be provided for assisting a service provider in fault management and facility provisioning. Examples will now be discussed in discussing FIGS. 8–12.

Operator Display Terminal: FIGS. 8–12

Figure 8:
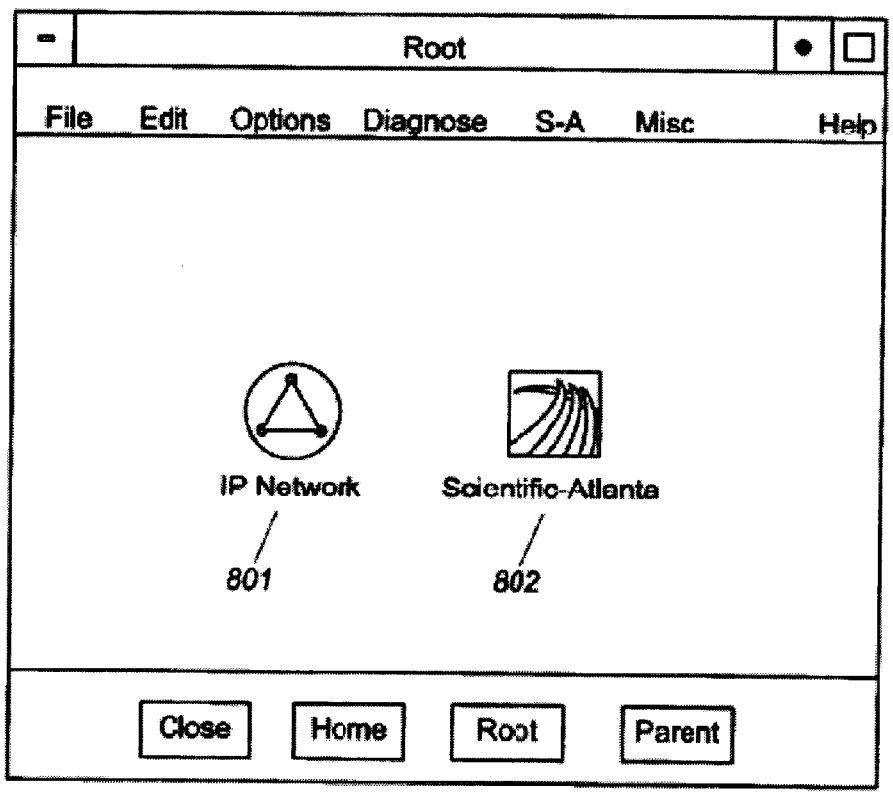
FIGS. 8–11 show examples of network status displays available through network control and management server 111, 125 in a tree hierarchy.
Figure 9:
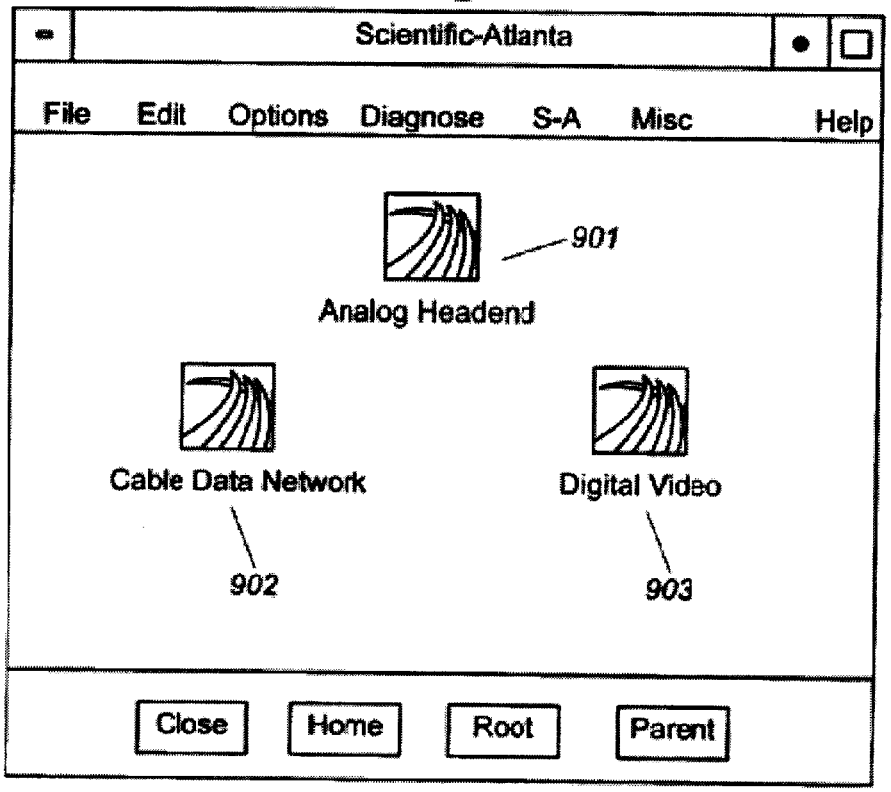

Referring to FIGS. 8–12, there is shown a sequence of screens that may be displayed at an operator display terminal 680 of a management and control server 111, 125 of the present invention. The sequence may be formed in a tree structure starting with a screen, for example, configured as FIG. 8 showing an Internet protocol network having a first icon 801 and a Scientific-Atlanta or other cable data network equipment manufacture icon 802. Windows may pop-up in response to mouse clicks or other input device selection of File, Edit, Options, Diagnose S-A, Misc, Close, Home, Root and Parent. Clicking on IP takes you to an IP network and an IP network topology in a similar manner to clicking on icon 802. Clicking on icon 802 leads the user to FIG. 9 where alternative networks provided by the service provider are located and identified by further icons 901, 902 and 903. For example, icon 901 may represent an analog headend for providing typical cable television services, icon 902 may refer to a cable data network as per FIGS. 1 or 2 and icon 903 may represent an enhanced digital cable network for providing video-on-demand, digital audio, digital game, energy management and other digital services. Clicking on icon 902, the topology 1001 is displayed, a similar topology to that shown by FIGS. 1 or 2. Further details regarding each component may be obtained then by clicking on the depicted component of the topology. The QPR modulator icon can flash, change color or otherwise indicate an alarm status or other condition of note that may collectively apply to the states of one or more QPR modulators.

Figures 10, 11:
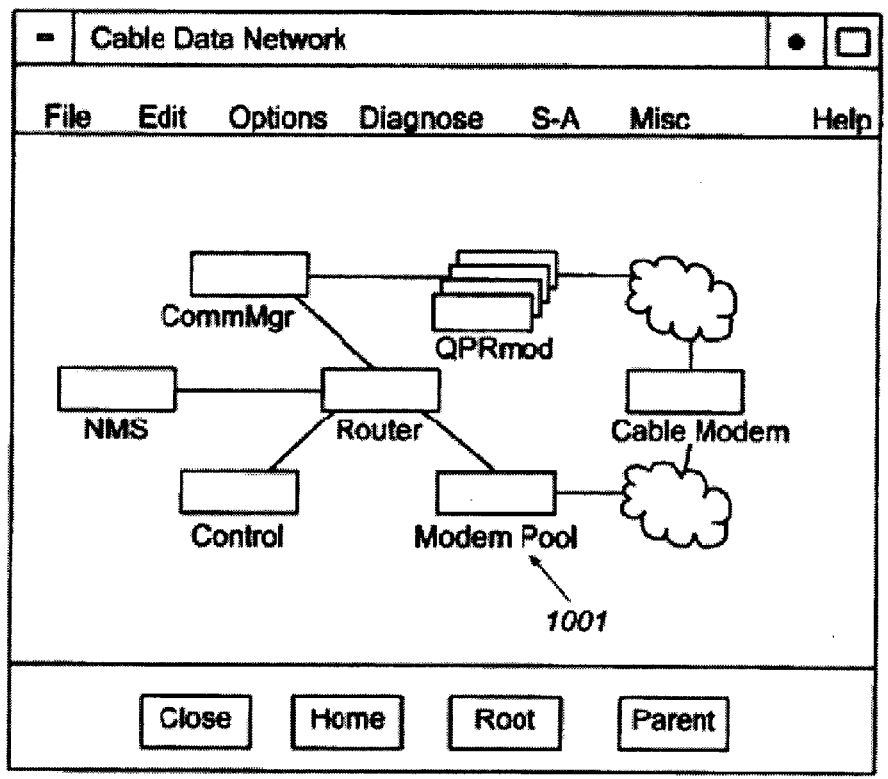
Figure 12:
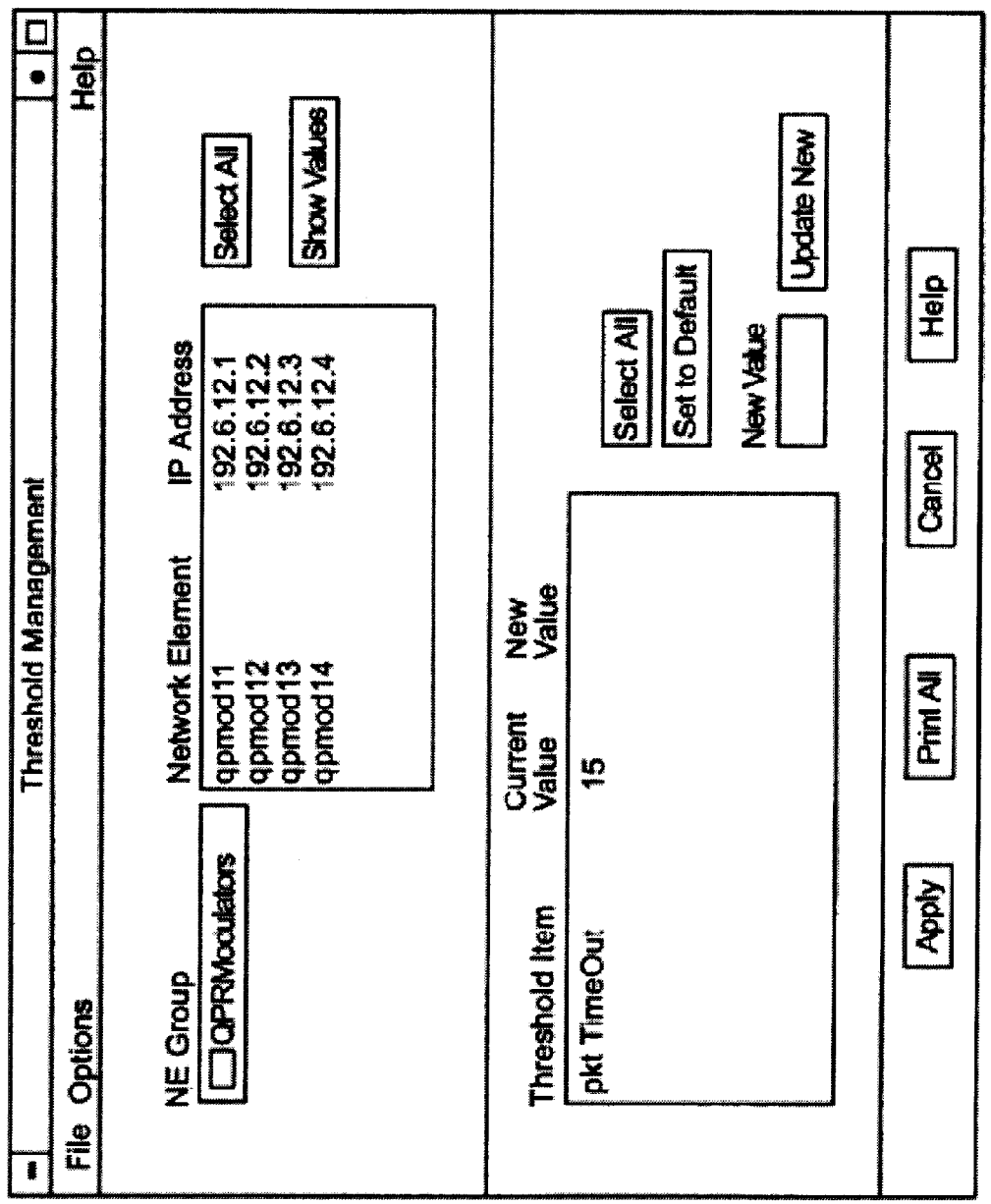

For example, through the communications manager icon, a service provider may retrieve a configuration or domain management screen per FIG. 11 or, by other input data, a threshold management screen FIG. 12. Domain management screen FIG. 11 shows which com mgr is associated with which QPR modulators, the frequency range of each modulator and subnet (IP) address identifiers. The threshold management screen of FIG. 12 identifies, for example, a threshold such as pkTimeOut and its current value that is associated with what equipment (QPR modulators) and their addresses. In this manner, a network operator can set thresholds for traps and other threshold setting for components of the network. Examples of threshold setting include but are not limited to bit error rate (BER), long connection timers for time-out, pipe queues and the like.

Thus, there is provided a hierarchy for recording and displaying individual resources of the network that assists in network management. For example, the communications manager resides over a QPR interface table which in turn resides over a pipe table for each QPR pipe. There can be a plurality of com managers, each having plural modulators and each of these supporting a plurality of data streams.

A fault management display is provided for viewing a fault having a particular level of severity determined by comparison with thresholds such as critical, whether the fault is hardware or software related, what triggered the event and its data and time stamp. To perform fault management, a process of detecting, isolating, reporting and recovering from faults within the network 100 involves correlation of data from a number of individual component managers and with the network topology.

A process statistics table may contain statistics useful for reporting process activity on the network 100. The table includes process identifier, a process description, the smallest number of users during a period of time, the time when the smallest number of users is recorded, and the same for the largest number of users. Process statistics control permits control of process, a sample range type and frequency, a time to begin sampling and a time to end sampling.

Thus there has been shown and described apparatus and a method for obtaining usage statistics in a cable data delivery system which meets the objectives sought. All United States patents and patent applications referenced herein should be deemed to be incorporated by reference as to their respective entire contents. The scope of the invention should only be deemed to be limited by the claims which follow.

What we claim is:

1. In a cable data network for delivering digital data originating via the Internet to a location of a cable modem upon a request conveyed using the cable modem, an apparatus for obtaining usage statistics comprising:
    a network manager including a controller and a software agent, the network manager connected over network protocol links to a plurality of network components, the plurality of network components being components of the cable data network; and
    the plurality of network components each including a software agent and a statistics database, the software agents included in the plurality of network components being responsive to the network manager controller for reporting the usage statistics to the network manager based upon an elapse of a poll interval, the cable modem being one of the plurality of network components that includes a software agent and a statistics database, the usage statistics comprising information related to historical usage of the cable data network by at least one network component of the plurality of network components.

2. The apparatus of claim 1, wherein an Internet protocol (IP) is utilized on the network protocol links, the Internet protocol being a connection-less, network layer protocol.

3. The apparatus of claim 1, wherein the cable modem maintains the statistics database included in the cable modem, the statistics database including one of data transferred, data discarded and uncorrectable data.

4. The apparatus of claim 1, wherein the network manager comprises a statistics database for preserving date and time of day of a session with the cable modem.

5. The apparatus of claim 4, wherein the date and time of day comprises a start time determined by assignment of an Internet address to the cable modem.

6. The apparatus of claim 1, wherein a communications manager is one of the plurality of network components, the communications manager including a software agent and a statistics database, the communications manager for controlling downstream data transmission via a plurality of data modulators.

7. The apparatus of claim 6, wherein the communications manager maintains the statistics database included in the communications manager, the statistics database including one of data transferred, data discarded and uncorrectable data.

8. The apparatus of claim 6, wherein the network manager comprises a statistics database for preserving date and time of day of a session with the cable modem.

9. The apparatus of claim 6, wherein the network manager comprises a statistics database for calculating data loss rate.

10. The apparatus of claim 3, wherein the data comprises Internet protocol packets of variable length.

11. The apparatus of claim 10, wherein the amount of data of the Internet protocol packets of variable length is determined from an estimate of average packet length times the number of Internet protocol packets.

12. The apparatus of claim 10, wherein the cable modem further comprises a decoder for disassembling Ethernet protocol packets to IP packets and for determining an amount of the data by counting an amount of data blocks from the Ethernet protocol packets of predetermined data length.

13. The apparatus of claim 1, wherein each network component of the plurality of network components further comprises traps for recording statistics related to threshold overload or underload, each network component of the plurality of network components transmitting data of the traps to the network manager and the network manager recording and timestamping receipt of the data of the traps.

14. In a cable data network for delivering digital data originating via the Internet to a location of a cable modem upon a request conveyed using the cable modem, a method for obtaining usage statistics comprising the steps of:
    dynamically assigning Internet protocol addresses to at least one network component of a plurality of network components of the cable data network;
    storing the usage statistics in the plurality of network components, the plurality of network components each including a software agent and a statistics database, the cable modem being one of the plurality of network components that includes a software agent and a statistics database the usage statistics being stored in the statistics databases included in the plurality of network components, the usage statistics comprising information related to historical usage of the cable data network by at least one network component of the plurality of network components; and
    collecting the usage statistics at a network manager, the network manager including a controller and a software agent, the network manager connected over network protocol links to the plurality of network components, the software agents included in the plurality of network components being responsive to the network manager controller for reporting the usage statistics to the network manager based upon an elapse of a poll interval.

15. The method of claim 14, wherein an Internet protocol (IP) is utilized on the network protocol links, the Internet protocol being a connection-less, network layer protocol.

16. The method of claim 14, wherein the cable modem maintains the statistics database included in the cable modem, the statistics database including one of data transferred, data discarded and uncorrectable data.

17. The method of claim 14, wherein the network manager comprises a statistics database for preserving date and time of day of a session with the cable modem and the date and time of day comprises a start time determined by assignment of an Internet address to the cable modem.

18. The method of claim 14, wherein a communications manager is one of the plurality of network components, the communications manager including a software agent and a statistics database, the communications manager for controlling downstream data transmission via a plurality of data modulators, the communications manager maintaining the statistics database included in the communications manager, the statistics database including one of data transferred, data discarded and uncorrectable data.

19. The method of claim 16, further comprising the steps at the cable modem of disassembling Ethernet protocol packets to IP packets and determining an amount of the data by counting an amount of data blocks from the Ethernet protocol packets of predetermined data length.

20. The method of claim 14, wherein each network component of the plurality of network components further comprises traps for recording statistics related to threshold overload or underload, each network component of the plurality of network components transmitting data of the traps to the network manager, the network manager recording and timestamping receipt of the data of the traps, the method further comprising the steps of defining a new trap and downloading the new trap to a network component of the plurality of network components for implementation.

21. The apparatus of claim 4, wherein the data transferred, data discarded and uncorrectable data statistics are logical network statistics.

22. The apparatus of claim 8, wherein the data transferred, data discarded and uncorrectable data statistics are logical network statistics.

23. The method of claim 16, wherein the data transferred, data discarded and uncorrectable data statistics are logical network statistics.

24. The method of claim 18, wherein the data transferred, data discarded and uncorrectable data statistics are logical network statistics.

25. The apparatus of claim 1, wherein the cable data network comprises an RF connection and a public switched telephone network (PSTN) connection.

26. The apparatus of claim 1, wherein the poll interval is different for different network components of the plurality of network components.

27. The apparatus of claim 1, wherein the usage statistics comprise a first type of usage statistics and a second type of usage statistics, the poll interval being different for the first type of usage statistics from the second type of usage statistics.

28. The apparatus of claim 1, wherein a simple network management protocol (SNMP) is utilized as a network management protocol for reporting the usage statistics to the network manager.

29. The apparatus of claim 1, wherein the software agents included in the plurality of network components are further responsive to the network manager controller for reporting the usage statistics to the network manager based upon a termination of a session with the cable modem, the session employed by the cable modem for communicating on the cable data network, the cable modem being one of the plurality of network components, the cable modem being capable of only one session at a time.

30. The apparatus of claim 29, wherein the session with the cable modem utilizes an Internet protocol (IP) on the network protocol links, the Internet protocol being a connection-less, network layer protocol that allows the cable modem to use the session to send at least one unicast IP datagram to each host of a plurality of hosts with different IP addresses, the at least one unicast IP datagram being at least partially conveyed over the cable data network in an upstream direction, the cable data network connected between a head end and the cable modem, the termination of the session with the cable modem terminating use of the cable data network by the cable modem.

31. The method of claim 14, wherein the cable data network comprises an RF connection and a public switched telephone network (PSTN) connection.

32. The method of claim 14, wherein the poll interval is different for different network components of the plurality of network components.

33. The method of claim 14, wherein the usage statistics comprise a first type of usage statistics and a second type of usage statistics, the poll interval being different for the first type of usage statistics from the second type of usage statistics.

34. The method of claim 14, wherein a simple network management protocol (SNMP) is utilized as a network management protocol for reporting the usage statistics to the network manager.

35. The method of claim 14, wherein the software agents included in the plurality of network components are further responsive to the network manager controller for reporting the usage statistics to the network manager based upon a termination of a session with the modem, the session employed by the cable modem for communicating on the cable data network, the cable modem being one of the plurality of network components, the cable modem being capable of only one session at a time.

36. The method of claim 35, wherein the session with the cable modem utilizes an Internet protocol (IP) on the network protocol links, the Internet protocol being a connection-less, network layer protocol that allows the cable modem to use the session to send at least one unicast IP datagram to each host of a plurality of hosts with different IP addresses, the at least one unicast IP datagram being at least partially converges over the cable data network in an upstream direction, the cable data network connected between a head end and the modem, the termination of the session with the cable modem terminating use of the cable data network by the cable modem.

37. In a cable data network for delivering digital data originating via the Internet to a location of a cable modem upon a request conveyed using the cable modem, an apparatus for obtaining usage statistics comprising:

a network manager including a controller and a software agent, the network manager connected over network protocol links to a plurality of network components, the plurality of network components being components of the cable data network; and the plurality of network components each including a software agent and a statistics database, the software agents included in the plurality of network components being responsive to the network manager controller for reporting the usage statistics to the network manager based upon a termination of a session with the cable modem, the session employed by the cable modem for communicating on the cable data network, the cable modem being one of the plurality of network components, the cable modem being capable of only one session at a time, the usage statistics comprising information related to historical usage of the cable data network by at least one network component of the plurality of network components.

38. The apparatus of claim 37, wherein the session with the cable modem utilizes an Internet protocol (IP) on the network protocol links, the Internet protocol being a connection-less, network layer protocol that allows the cable modem to use the session to send at least one unicast IP datagram to each host of a plurality of hosts with different IP addresses, the at least one unicast IP datagram being at least partially conveyed over the cable data network in an upstream direction, the cable data network connected between a head end and the cable modem, the termination of the session with the cable modem terminating use of the cable data network by the cable modem.

39. The apparatus of claim 38, wherein a simple network management protocol (SNMP) is utilized as a network management protocol for reporting the usage statistics to the network manager.

40. The apparatus of claim 38, wherein the termination of the session with the cable modem comprises a termination of a connection-oriented, link layer protocol.

41. The apparatus of claim 40, wherein the connection-oriented, link layer protocol is a point-to-point protocol (PPP).

42. The apparatus of claim 41, wherein the point-to-point protocol is utilized over a public switched telephone network (PSTN) link.

43. The apparatus of claim 38, wherein the cable modem includes a software agent and a statistics database, the cable modem maintaining the statistics database included in the cable modem, the statistics database including one of data transferred, data discarded and uncorrectable data.

44. The apparatus of claim 38, wherein the data comprises Internet protocol packets of variable length.

45. The apparatus of claim 44, wherein the cable modem further comprises a decoder for disassembling Ethernet protocol packets to IP packets and for determining an amount of the data by counting an amount of data blocks from the Ethernet protocol packets of predetermined data length.

46. The apparatus of claim 38, wherein the network manager comprises a statistics database for preserving date and time of day of a session with the cable modem, and the date and time of day comprises a start time determined by assignment of an Internet to the address to the modem.

47. The apparatus of claim 38, wherein a communications manager is one of the plurality of network components, the communications manager including a software agent and a statistics database, the communications manager for controlling downstream data transmission via a plurality of data modulators, the communications manager maintaining the statistics database included in the communications manager, the statistics database including one of data transferred, data discarded and uncorrectable data.

48. The apparatus of claim 38, wherein each network component of the plurality of network components further comprises traps for recording statistics related to threshold overload or underload, each network component of the plurality of network components transmitting data of the traps to the network manager, and the network manager recording and timestamping receipt of the data of the traps.

49. An apparatus in a cable data network, the apparatus being a network manager for obtaining usage statistics, the apparatus comprising:
a network manager statistics database; and
a network manager software agent for collecting the usage statistics from a plurality of cable modems and for storing the usage statistics in the network manager statistics database, the network manager connected over the cable data network to the plurality of cable modems, the cable data network for conveying digital data, each cable modem of the plurality of cable modems including a software agent and a cable modem statistics database, the software agents included in the plurality of cable modems being responsive to the network manager for reporting the usage statistics to the network manager, the reporting of the usage statistics being conveyed through the cable data network between the network manager and at least one cable modem of the plurality of cable modems, the cable data network connected between a head end and each cable modem of the plurality of cable modems, the usage statistics comprising information related to historical usage of the cable data network by the plurality of cable modems.

50. The apparatus of claim 49, wherein the cable modem statistics databases are maintained by the plurality of cable modems, the cable modem statistics databases each including one of data transferred, data discarded and uncorrectable data.

51. The apparatus of claim 50, wherein the data comprises Internet protocol packets of variable length.

52. The apparatus of claim 51, wherein each cable modem of the plurality of cable modems further comprises a decoder for disassembling Ethernet protocol packets to IP packets and for determining an amount of the data by counting an amount of data blocks from the Ethernet protocol packets of predetermined data length.

53. The apparatus of claim 49, wherein the network manager statistics database preserves a first date and time of day of a first session with a first cable modem of the plurality of cable modems, the first date and time of day comprising a first start time determined by assignment of a first Internet address to the first cable modem of the plurality of cable modems, and wherein the network manager statistics database further preserves a second date and time of day of a second session with a second cable modem of the plurality of cable modems, the second date and time of day comprising a second start time determined by assignment of a second Internet address to the second cable modem of the plurality of cable modems.

54. The apparatus of claim 49, wherein each cable modem of the plurality of cable modems further comprises traps for recording statistics related to threshold overload or underload, each cable modem of the plurality of cable modems transmitting data of the traps to the network manager, and the network manager recording and timestamping receipt of the data of the traps.

55. The apparatus of claim 49, wherein the cable data network utilizes an Internet protocol (IP), the Internet protocol being a connection-less, network layer protocol.

56. The apparatus of claim 49, wherein the cable data network comprises an RF connection and a public switched telephone network (PSTN) connection.

57. The apparatus of claim 49, wherein a simple network management protocol (SNMP) is utilized as a network management protocol for reporting the usage statistics to the network manager.

58. The apparatus of claim 57, wherein the software agents included in the plurality of cable modems are responsive to the network manager for reporting the usage statistics to the network manager based upon at least one elapse of at least one poll interval.

59. The apparatus of claim 58, wherein a first software agent included in a first cable modem of the plurality of cable modems is further responsive to the network manager for reporting the usage statistics to the network manager based upon a termination of a first session with the first cable modem, the first session employed by the first cable modem for communicating on the cable data network, the first cable modem being capable of only one session at a time, and wherein a second software agent included in a second cable modem of the plurality of cable modems is further responsive to the network manager for reporting the usage statistics to the network manager based upon a termination of a second session with the second cable modem, the second session employed by the second cable modem for communicating on the cable data network, the second cable modem being capable of only one session at a time.

60. The apparatus of claim 59, wherein the first session with the first cable modem utilizes an Internet protocol (IP) on the cable data network, the Internet protocol being a connection-less, network layer protocol that allows the first cable modem to use the first session to send at least one first unicast IP datagram to each host of a plurality of hosts with different IP addresses, the at least one first unicast IP datagram being at least partially conveyed upstream over the cable data network, the termination of the first session with the first cable modem terminating use of the cable data network by the first cable modem, and wherein the second session with the second cable modem utilizes an Internet protocol (IP) on the cable data network, the Internet protocol being a connection-less, network layer protocol that allows the second cable modem to use the second session to send at least one second unicast IP datagram to each host of the plurality of hosts with different IP addresses, the at least one second unicast IP datagram being at least partially conveyed upstream over the cable data network, the termination of the second session with the second cable modem terminating use of the cable data network by the second cable modem.

61. The apparatus of claim 60, wherein each cable modem of the plurality of cable modems further includes a cable modem statistics database, the cable modem statistics databases being maintained by the plurality of cable modems, the cable modem statistics databases each including one of data transferred, data discarded and uncorrectable data.

62. The apparatus of claim 60, wherein the network manager statistics database preserves a first date and time of day of a first session with a first cable modem of the plurality of cable modems, the first date and time of day comprising a first start time determined by assignment of a first Internet address to the first cable modem of the plurality of cable modems, and wherein the network manager statistics database further preserves a second date and time of day of a second session with a second cable modem of the plurality of cable modems, the second date and time of day comprising a second start time determined by assignment of a second Internet address to the second cable modem of the plurality of cable modems.

* * * * *

UNITED STATES PATENT AND TRADEMARK OFFICE
CERTIFICATE OF CORRECTION

PATENT NO.   : 6,308,328 B1
DATED         : October 23, 2001
INVENTOR(S)  : Bowcutt et al.

It is certified that error appears in the above-identified patent and that said Letters Patent is hereby corrected as shown below:

Column 1,
Line 34, delete "fill" and insert therefore -- full --
Line 50, delete "In stead," and insert therefore -- Instead, --

Column 2,
Line 2, delete "Gane" and insert therefore -- Game --

Column 3,
Line 11, delete second occurrence of "a" before "session"

Column 5,
Line 36, delete "ether type" and insert therefore -- ethertype --

Column 7,
Line 4, delete "Route"" and insert therefore -- Router" --

Column 9,
Line 3, insert a comma after "of"

Column 15,
Line 63, delete "RE modem" and insert therefore -- RF modem --

Column 16,
Line 17, delete "RE modem" and insert therefore -- RF modem --

Column 17,
Line 39, delete "MIB's)" and insert therefore -- (MIB's) --

Column 18,
Line 26, delete "corn" and insert therefore -- com --

Column 22,
Line 28, insert a comma after the first occurrence of "network manager"
Line 65, insert a comma after "modem"

UNITED STATES PATENT AND TRADEMARK OFFICE
CERTIFICATE OF CORRECTION

PATENT NO. : 6,308,328 B1
DATED : October 23, 2001
INVENTOR(S) : Bowcutt et al.

It is certified that error appears in the above-identified patent and that said Letters Patent is hereby corrected as shown below:

Column 24,
Line 25, insert -- cable -- between "the" and "modem,"
Line 37, delete "converges" and insert therefore -- conveyed --
Line 39, insert -- cable -- between "the" and "modem,"

Column 25,
Line 40, delete "to the" before "address"
Line 40, insert "cable" between "the" and "modem."

Signed and Sealed this

Twenty-third Day of July, 2002

*Attest:*

JAMES E. ROGAN
*Attesting Officer*   *Director of the United States Patent and Trademark Office*